US010144471B2

(12) United States Patent
Lang et al.

(10) Patent No.: US 10,144,471 B2
(45) Date of Patent: Dec. 4, 2018

(54) PASSENGER SEAT HAVING A BACKREST FOR A STRADDLE-SEAT VEHICLE

(71) Applicant: BOMBARDIER RECREATIONAL PRODUCTS INC., Valcourt (CA)

(72) Inventors: Serge Lang, Valcourt (CA); Richard Lefebvre, Shefford (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 144 days.

(21) Appl. No.: 15/022,061

(22) PCT Filed: Apr. 30, 2015

(86) PCT No.: PCT/IB2015/053173
§ 371 (c)(1),
(2) Date: Mar. 15, 2016

(87) PCT Pub. No.: WO2015/166460
PCT Pub. Date: Nov. 5, 2015

(65) Prior Publication Data
US 2016/0221624 A1  Aug. 4, 2016

Related U.S. Application Data

(60) Provisional application No. 61/986,826, filed on Apr. 30, 2014.

(51) Int. Cl.
*B62J 1/28* (2006.01)
*B62J 1/12* (2006.01)
(Continued)

(52) U.S. Cl.
CPC ............ *B62J 1/28* (2013.01); *B60N 2/01583* (2013.01); *B60N 2/40* (2013.01); *B60N 2/68* (2013.01);
(Continued)

(58) Field of Classification Search
CPC ........... B62J 1/28; B60N 2/01583; B60N 2/40
See application file for complete search history.

(56) References Cited

U.S. PATENT DOCUMENTS 2,587,731 A   3/1952  Irving
2,963,074 A * 12/1960  Woodard ................. B60N 2/06
                                                      296/64
(Continued)

OTHER PUBLICATIONS

International Search Report of PCT/IB2015/053173; Shane Thomas; dated Aug. 12, 2015.

*Primary Examiner* — David R Dunn
*Assistant Examiner* — Tania Abraham
(74) *Attorney, Agent, or Firm* — BCF LLP

(57) ABSTRACT

A vehicle straddle seat has a base extending generally in a first direction from a first edge. A backrest, formed integrally with the base, is spaced from the first edge and extends away from the base in a second direction generally perpendicular to the first direction. The backrest includes a first surface facing generally towards the first edge and a second surface facing away therefrom. A plurality of ribs formed on at least one of the first and second surfaces extends at least in the second direction. The plurality of ribs is configured to allow flexing of at least a portion of the backrest with respect to the base towards the first edge and away therefrom. The first surface is rigidly connected to the second surface so that the first and second surfaces flex together with respect to the base. Latch mechanisms and vehicles having the seat are also disclosed.

23 Claims, 30 Drawing Sheets

(51) Int. Cl.
  *B60N 2/68*     (2006.01)
  *B60N 2/015*    (2006.01)
  *B60N 3/02*     (2006.01)
  *B62K 5/01*     (2013.01)
  *B60N 2/40*     (2006.01)

(52) U.S. Cl.
  CPC    *B60N 3/02* (2013.01); *B62J 1/12* (2013.01); *B62K 5/01* (2013.01)

(56)               References Cited

U.S. PATENT DOCUMENTS

| | | | |
|---|---|---|---|
| 3,357,737 A | | 12/1967 | Vettel et al. |
| 3,560,048 A | | 2/1971 | Flint |
| 4,125,285 A | * | 11/1978 | Hanagan ............... B62J 1/12 |
| | | | 297/195.12 |
| 6,007,150 A | * | 12/1999 | Clerkin ............... B62J 1/28 |
| | | | 297/215.12 |
| 6,179,363 B1 | | 1/2001 | Palajac et al. |
| 6,659,547 B2 | * | 12/2003 | Petersen ............... B62J 1/28 |
| | | | 280/304.4 |
| 7,147,281 B2 | * | 12/2006 | Michisaka ............ B62K 19/46 |
| | | | 297/215.12 |
| 7,506,932 B2 | * | 3/2009 | Bostrom .............. B60N 2/40 |
| | | | 248/421 |
| 2006/0290179 A1 | * | 12/2006 | Reinhard ............... B62J 1/28 |
| | | | 297/215.11 |
| 2012/0242120 A1 | | 9/2012 | Smith et al. |
| 2014/0061269 A1 | * | 3/2014 | Hawkins ............... B62J 7/04 |
| | | | 224/413 |
| 2014/0110983 A1 | | 4/2014 | Sander |

\* cited by examiner

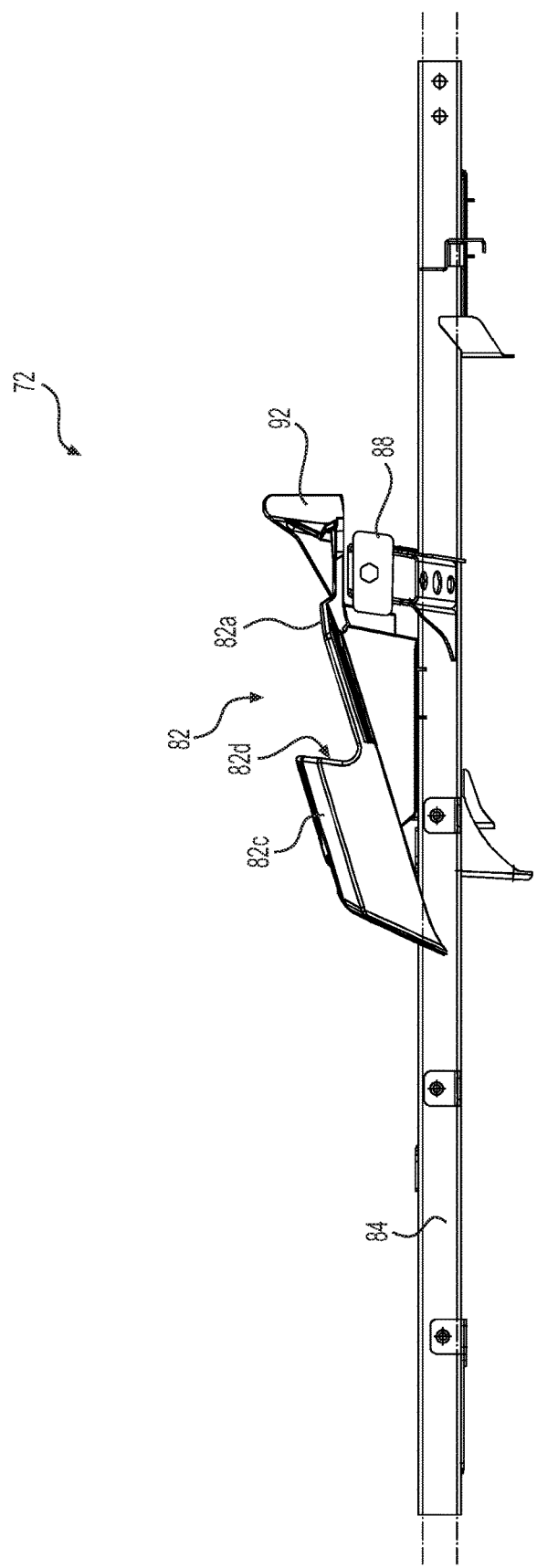

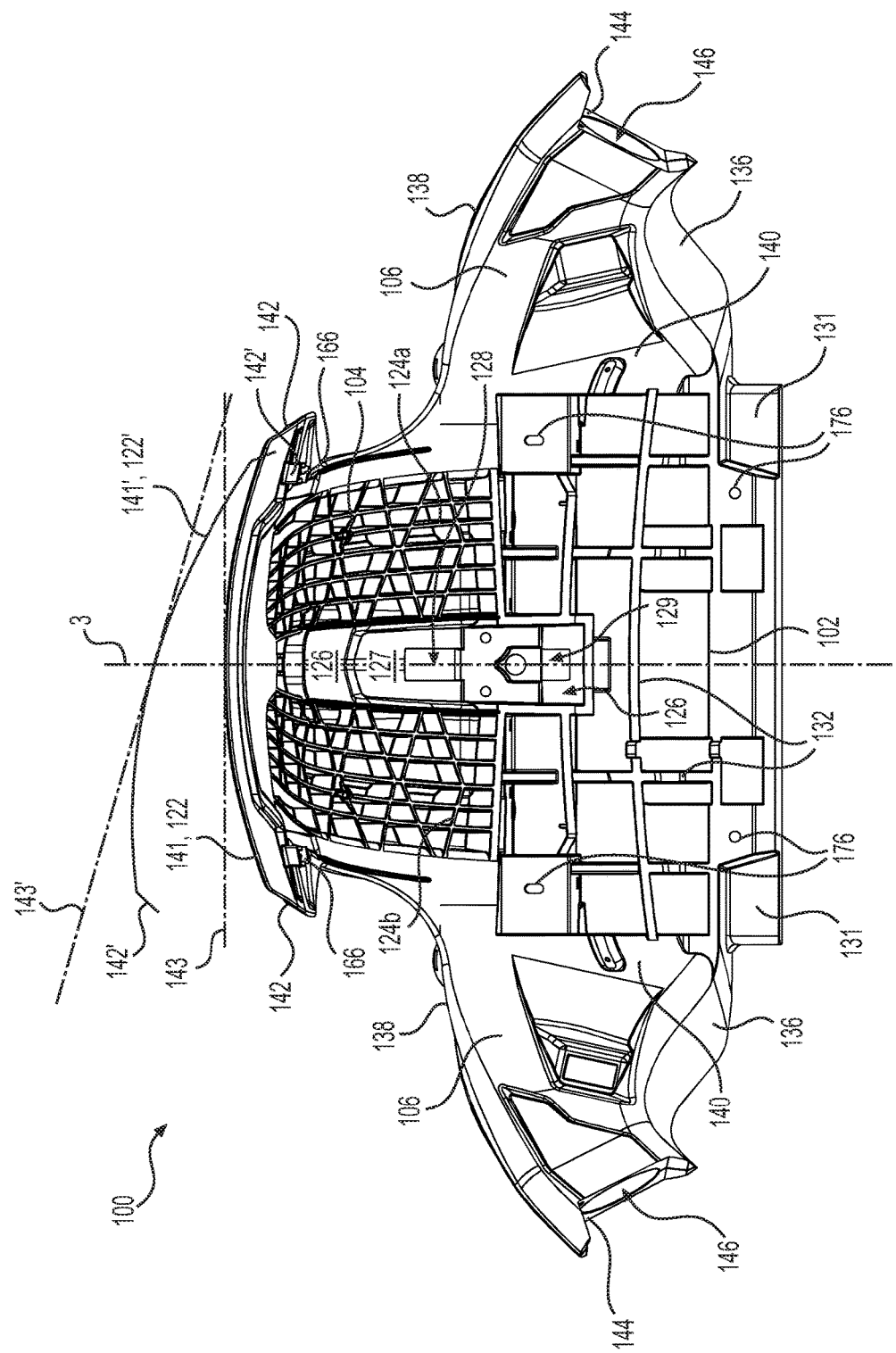

PASSENGER SEAT HAVING A BACKREST FOR A STRADDLE-SEAT VEHICLE

CROSS-REFERENCE

The present application claims priority to U.S. Provisional Patent Application No. 61/986,826, filed Apr. 30, 2014, the entirety of which is incorporated herein by reference.

TECHNOLOGICAL FIELD

The present technology relates to straddle seats for vehicles.

BACKGROUND

Straddle seat vehicles such as all-terrain vehicles (ATVs) are used for utility and recreational purposes. The vehicles may sometimes be used for transporting cargo and other times for carrying one or more passengers in addition to the driver. It is also desirable to have the ability to reconfigure the vehicle as desired to accommodate a passenger, and at other times, only a driver. Thus, there is a need for a lightweight passenger seat that can comfortably accommodate the passenger while the vehicle is being operated on different kinds of terrains and that can also be manufactured cheaply. There is also a need for a passenger seat that can be conveniently installed and removed from the vehicle.

SUMMARY

It is an object of the present technology to ameliorate at least some of the inconveniences present in the prior art.

In one aspect, the present provides a straddle seat for a vehicle having a base comprising a first edge and extending generally in a first direction from the first edge. A backrest is formed integrally with the base and spaced from the first edge thereof. The backrest extends away from the base in a second direction, the second direction being generally perpendicular to the first direction. The backrest includes a first surface facing generally towards the first edge of the base and a second surface facing away from the first edge of the base. A plurality of ribs formed on at least one of the first and second surfaces extends at least in the second direction. The plurality of ribs is configured to allow flexing of at least a portion of the backrest with respect to the base towards the first edge and away from the first edge. The first surface is rigidly connected to the second surface so that the first and second surfaces flex together with respect to the base.

In a further aspect, a vehicle includes a frame, a motor connected to the frame, and at least one ground engaging member operatively connected to the motor. The at least one ground engaging member is one of: a wheel, a ski, and a track. A straddle seat is connected to the frame and configured to support at least one rider. The straddle seat includes a base having a first edge and extending generally in a first direction from the first edge. A backrest is formed integrally with the base and spaced from the first edge thereof. The backrest extends away from the base in a second direction, the second direction being generally perpendicular to the first direction. The backrest includes a first surface facing generally towards the first edge of the base and a second surface facing away from the first edge of the base. A plurality of ribs formed on at least one of the first and second surfaces extends at least in the second direction. The plurality of ribs is configured to allow flexing of at least a portion of the backrest with respect to the base towards the first edge and away from the first edge. The first surface is rigidly connected to the second surface so that the first and second surfaces flex together with respect to the base.

In an additional aspect, a seat is provided for selective connection to a vehicle. The seat includes a base, a seat base cushion disposed at least in part on the base, a backrest connected to the base and extending generally perpendicular to the base, a backrest cushion connected to the backrest and configured to abut a back of a rider seated on the seat base cushion when the seat is connected to the vehicle. A latch mechanism selectively fastens the seat to the vehicle. The latch mechanism has a latched configuration and an unlatched configuration. The latch mechanism has a latch release handle for moving the latch mechanism between the latched configuration and the unlatched configuration. The latch release handle is accessible via a space between the seat base cushion and the backrest cushion.

For purposes of the present application, terms related to spatial orientation when referring to a vehicle and components in relation to the vehicle, such as "forwardly", "rearwardly", "left", "right", "above" and "below", are as they would be understood by a driver of the vehicle sitting thereon in an upright driving position, with the vehicle steered straight-ahead.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 2C is a left side elevation view of the upper portion and the passenger seat spacer of FIG. 2B;

FIG. 7C is a top plan view of seat base, backrest and handle mounting portions of FIG. 7A, showing in dotted lines the position of the backrest in a flexed position;

DETAILED DESCRIPTION

The present technology will be described with reference to a four-wheeled straddle-seat all-terrain vehicle (ATV) 10. However, it is contemplated that aspects of the ATV 10 could be used in other types of straddle-seat vehicles, such as three-wheeled vehicles, motorcycles, snowmobiles and the like.

Figure 1A:
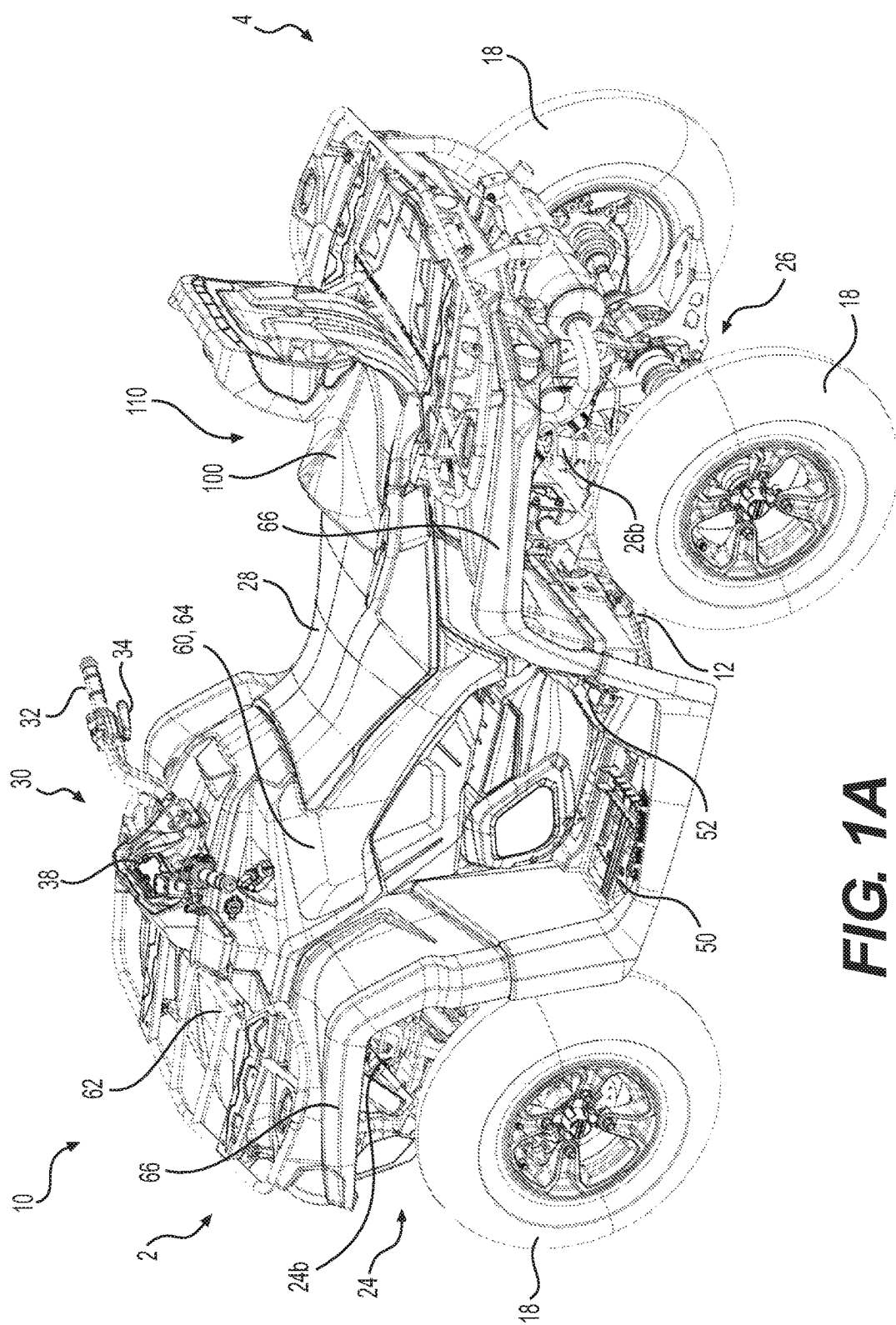
FIG. 1A is a perspective view, taken from a rear, left side, of a straddle-seat vehicle.
Figure 1B:
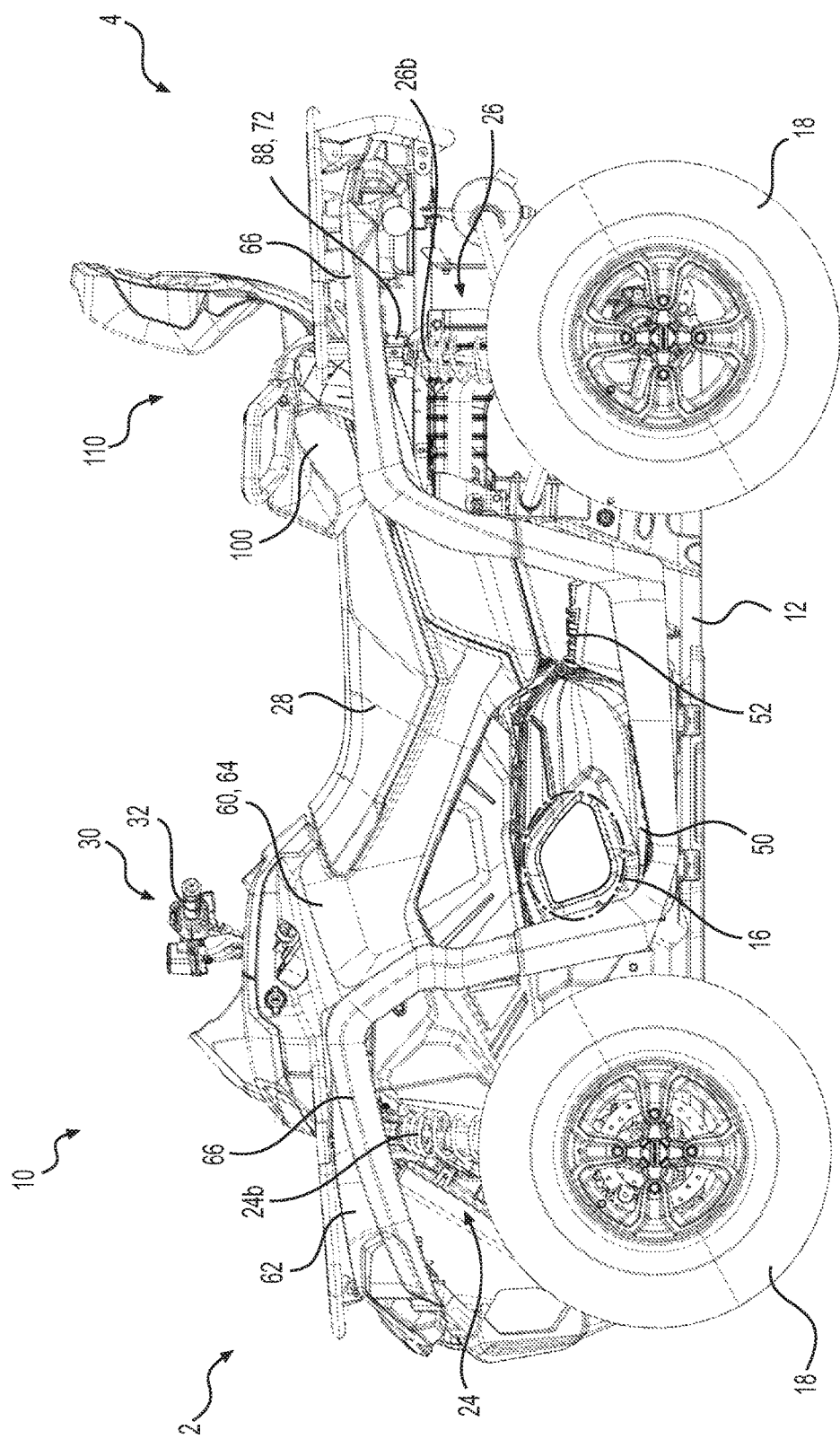
FIG. 1B is a left side elevation view of the vehicle of FIG. 1A.
Figure 1C:
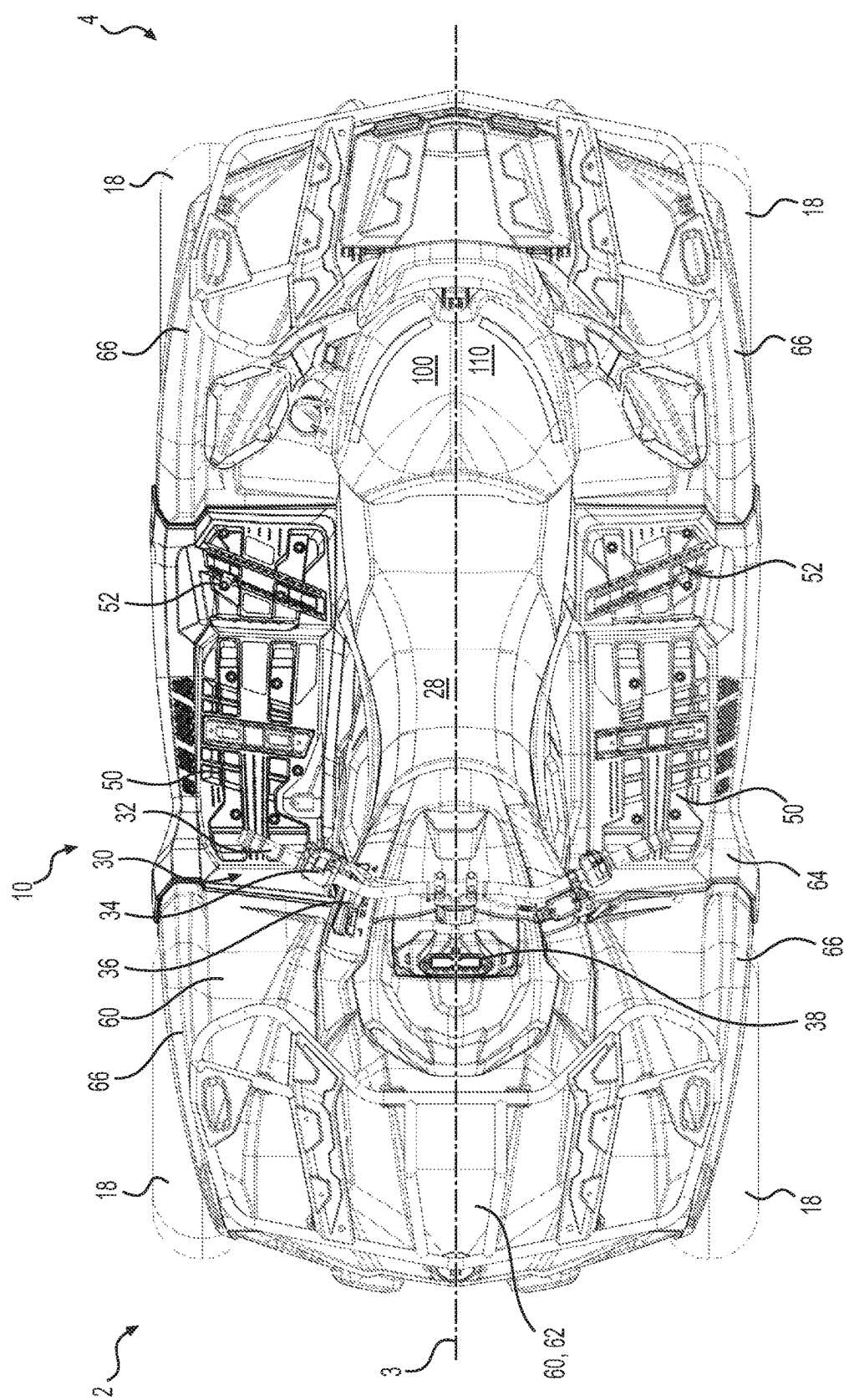
FIG. 1C is a top plan view of the vehicle of FIG. 1A.

With reference to FIGS. 1A to 1C, the ATV 10 has a front end 2 and a rear end 4 defined consistently with a forward travel direction of the ATV 10. A longitudinal centerplane 3 (FIG. 1C) extends vertically and longitudinally through the lateral center of the ATV 10. The ATV 10 has a frame 12 to which is mounted an internal combustion engine 16 (shown schematically in FIG. 1B) for powering the ATV 10.

Figure 2A:
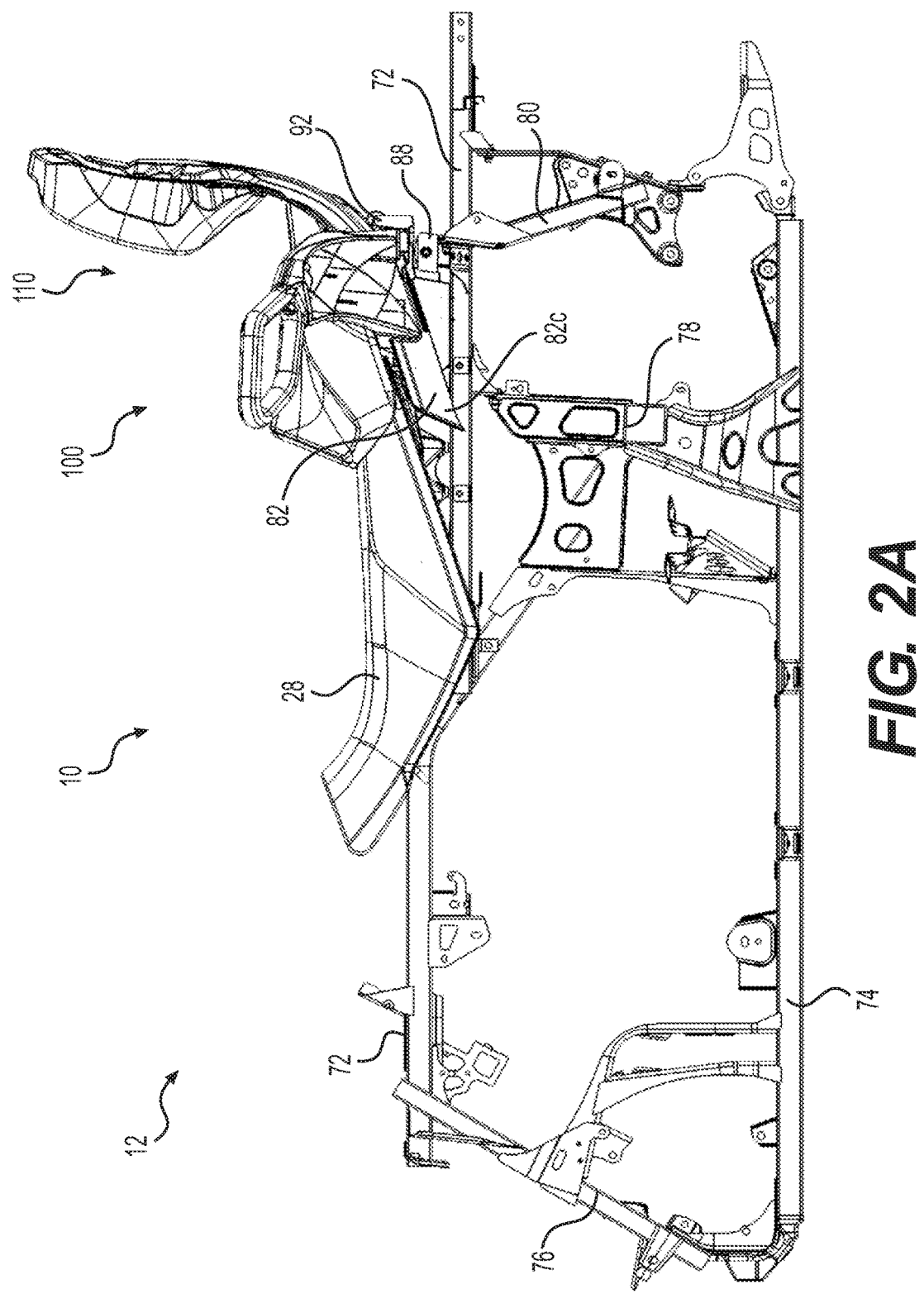
FIG. 2A is a left side elevation view of the frame, driver seat and passenger seat of the vehicle of FIG. 1A.
Figure 2B:
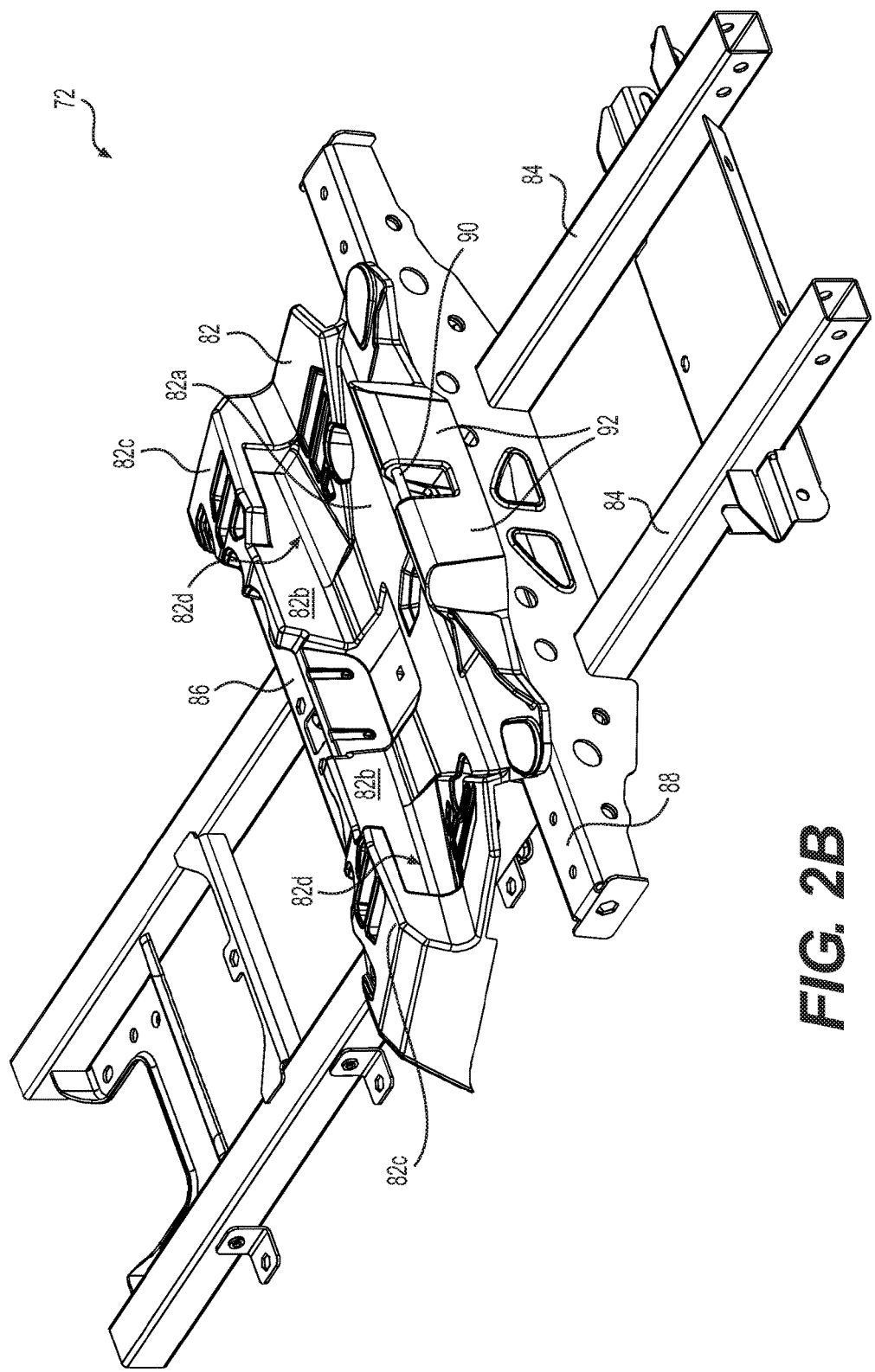
FIG. 2B is a perspective view, taken from a rear, left side, of an upper portion and a passenger seat spacer of the frame of FIG. 2A.
Figure 2D:
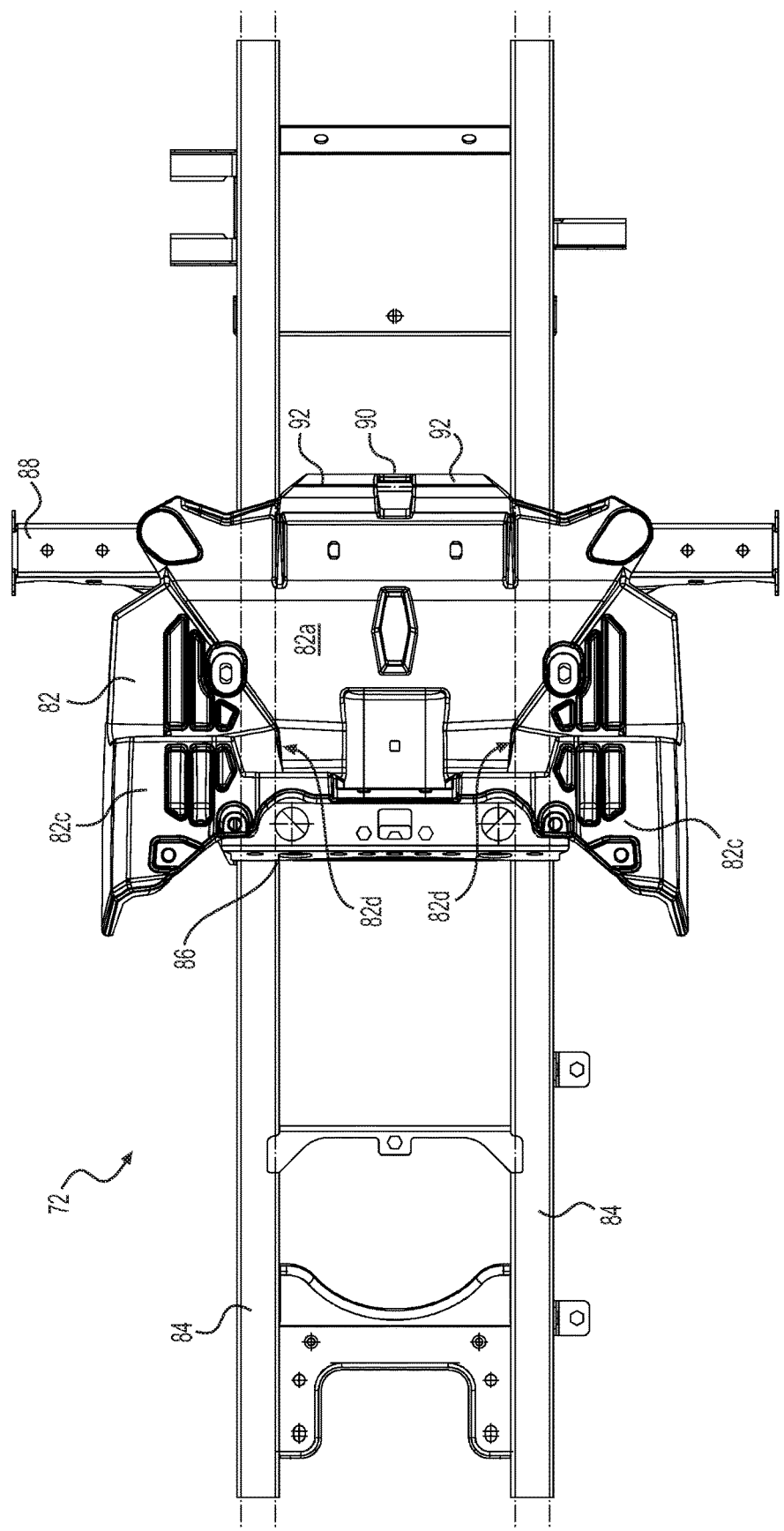
FIG. 2D is a top plan view of the upper portion and the passenger seat spacer of FIG. 2B.

As can be seen in FIG. 2A, the frame 12 has an upper frame member 72 and a lower frame member 74 which are connected by a forward frame member 76, a middle frame member 78 and a rear frame member 80. As can be seen in FIGS. 2B to 2D, the upper frame member 72 is made of two laterally separated longitudinally extending beams 84, and a front transverse beam 86 and a rear transverse beam 88 each extending transversely across the longitudinal beams 84. The transverse beams 86, 88 are disposed on the upper surfaces of the longitudinal beams 84.

The ATV 10 has two front wheels 18 and two rear wheels 18. The wheels 18 are operatively connected to the engine 16 via a transmission (not shown). Each of the four wheels 18 is provided with low-pressure balloon tires adapted for off-road conditions and traversing rugged terrain. It is contemplated that the ATV 10 could have only three wheels 18.

The two front wheels 18 are suspended from the frame 12 by respective front suspension assemblies 24 while the two rear wheels 18 are suspended from the frame 12 by respective rear suspension assemblies 26. Each front suspension assembly 24 includes an A-arm (not shown) and a shock absorber 24b. The A-arm 24a has one end pivotally connected to the lower frame member 74 and the other end supporting the axle of its corresponding front wheel 18. The shock absorber 24b has one end pivotally connected to its corresponding A-arm 24a and the other end connected to the upper frame member 72. Each rear suspension assembly 26 consists of a swing arm (not shown) and a shock absorber 26b. The swing arm 26a has one end pivotally connected to the rear frame member 50 and the other end supporting the axle of its corresponding rear wheel 18. The shock absorber 26b has one end pivotally connected to the upper frame member 72 and the other end pivotally connected to its corresponding swing arm 26a.

The ATV 10 further includes a straddle seat 28 mounted to the frame 12 for accommodating a driver of the ATV 10. Driver footrests 50 are provided on either of the driver seat 28 and are disposed vertically lower than the driver seat 28 to support the driver's feet. Another straddle seat 100 is provided behind the driver seat 28 to accommodate a passenger. The passenger seat 100 is removably mounted to the frame 12 and will be described below in further detail. A passenger footrest 52 is provided longitudinally rearward of each of the left and right driver footrests 50. The passenger footrests 52 are disposed slightly higher than the driver footrests 50 and designed to accommodate the feet of a passenger seated on the passenger seat 100 which is disposed slightly vertically higher than the driver seat 28.

A steering assembly 30 is rotationally supported by the frame 12 to enable a driver to steer the ATV 10. The steering assembly 30 includes a handlebar 32 connected to a steering column (not shown) for actuating steering linkages connected to left and right front wheels 18. A throttle operator 34 (FIG. 1A), in the form of a thumb-actuated throttle lever, is mounted to the handlebar 32. Other types of throttle operators, such as a finger-actuated throttle lever and a twist grip, are also contemplated. A gear shifter 36 (FIG. 1C) located near the handlebar 32 is connected to the transmission and enables a driver to select one of a plurality of gear configurations for operation of the vehicle 10. In the illustrated embodiment of the vehicle 10, the gear configurations include park, neutral, reverse, low, and drive. It is contemplated that the sequence and/or number of gear configurations could be different than as shown herein. A display cluster 38, includes a number of gauges and buttons, is disposed forwardly of the steering assembly 30.

The ATV 10 includes fairings 60 including a hood 62 hingedly connected at the front end 2 of the ATV 10 and several side panels 64 extending over a lateral side of the ATV 10. A fender 66 is disposed over each wheel 18 to protect the driver and/or passenger from dirt, water and other debris being projected by the rotating wheels 18.

The ATV 10 includes other components such as an air intake system, an exhaust system, radiators, headlights, and the like. As it is believed that these components would be readily recognized by one of ordinary skill in the art, further explanation and description of these components will not be provided herein.

The passenger seat 100 will now be described in more detail with reference to FIGS. 2A to 8D.

As can be seen in FIGS. 2A to 2D, the passenger seat 100 is disposed on a spacer 82 to reduce transfer of vibrations from the frame 12 to the passenger seat 100. The spacer 82 is made of plastic and fixed to the upper frame member 72. The spacer 82 extends laterally across the upper frame member 72. The spacer 82 is supported on the upper surface of the transverse beams 86, 88. The spacer 82 extends laterally outwardly of both longitudinal beams 84 and the front transverse beam 86. The rear transverse beam 88 extends laterally outwardly of the spacer 82 on both sides of the spacer 82. A rear portion of the spacer 82 disposed rearward of the rear transverse beam 88 includes a rod 90 extending laterally between a pair of upwardly extending and laterally spaced brackets 92. As will be explained in further detail below, the rod 90 is selectively engaged by a latch mechanism 200 of the seat 100 to fasten the seat 100 to the vehicle 10. An upper surface of the spacer 82a extends forward from the brackets 92 to a vertical wall 82b. The upper surface 82a extends downwardly and forwardly from the upper surface of the rear transverse beam 88 toward the bottom of the front transverse beam 86. The vertical wall 82b extends upwards from the surface 82a and is disposed just rearward of the front transverse beam 86. The left edge of the vertical wall 82b is connected to a front left portion 82c of the spacer 82 and the right edge of the vertical wall 82b is connected to a front right portion 82c of the spacer 82. The front left portion 82c extends rearwardly from the top edge of the left end of the vertical wall 82b and is spaced from the upper surface 82a. The front left portion 82c also extends vertically and rearwardly from the left edge of the vertical wall 82b. A left slot 82d is thus formed between the upper surface 82a, the front left portion 82c and the left end of the vertical wall 82b. The front left portion 82c of the spacer 82 also extends forward on the upper surface of the front transverse beam 86 and is bolted thereto. The front left portion 82c extends vertically downward on a left side of the left end of the front transverse beam 86. The front right portion 82c is a mirror image of the front left portion 82c forming a right slot 82d that is a mirror image of the left slot 82d. As such, corresponding features of the left and right portions 82c have been labelled with the same reference numbers and will not be described herein again.

It is also contemplated that the spacer 82 could be configured differently than as shown herein. It is contemplated that the spacer 82 could be omitted and the seat 100 could be connected directly to the upper frame member 72.

Figure 3A:
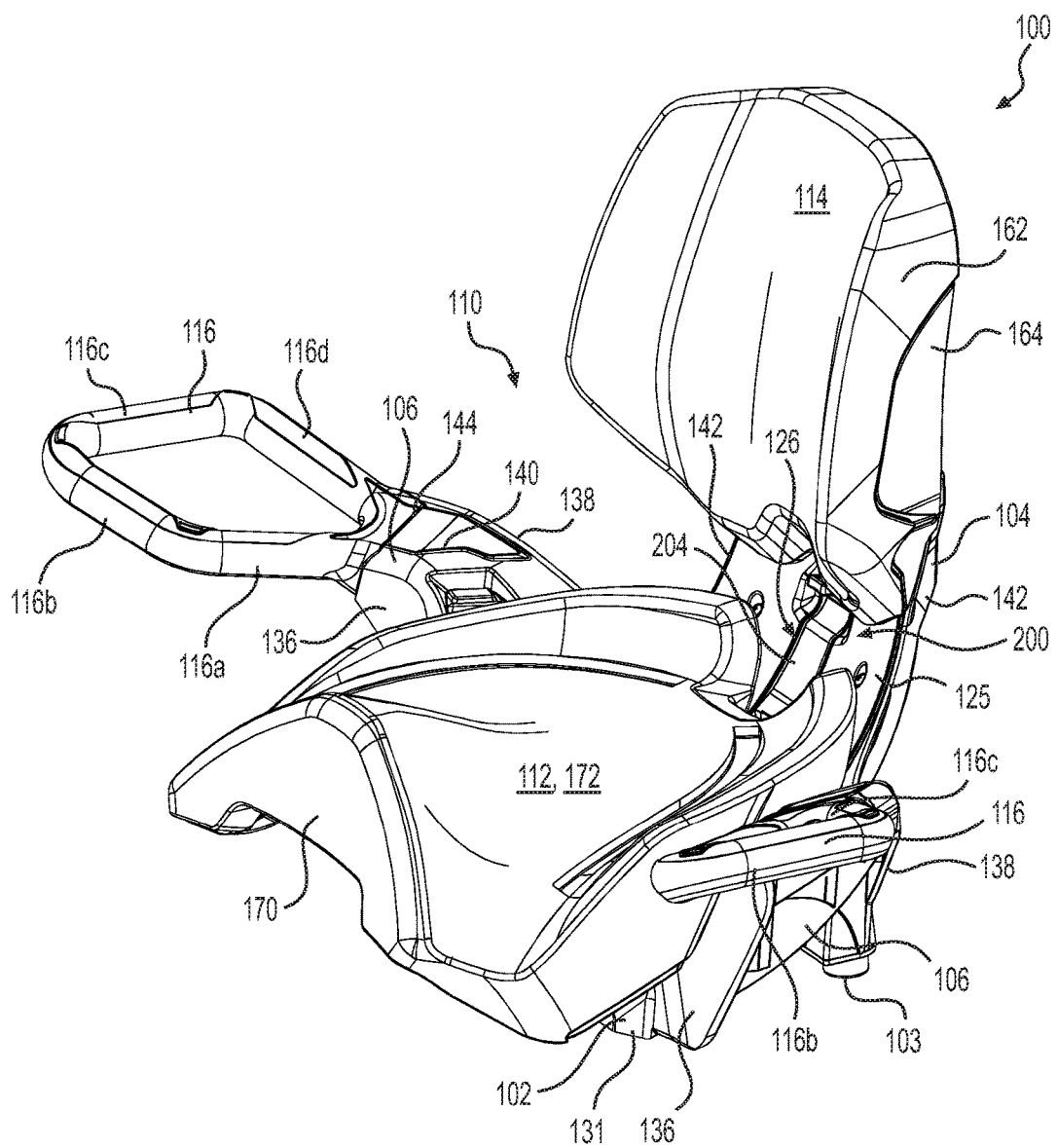
FIG. 3A is a perspective view, taken from a front, left side, of the passenger seat of the vehicle of FIG. 1 shown in isolation and with the latch mechanism disposed in a latched and engaged position.
Figure 3B:
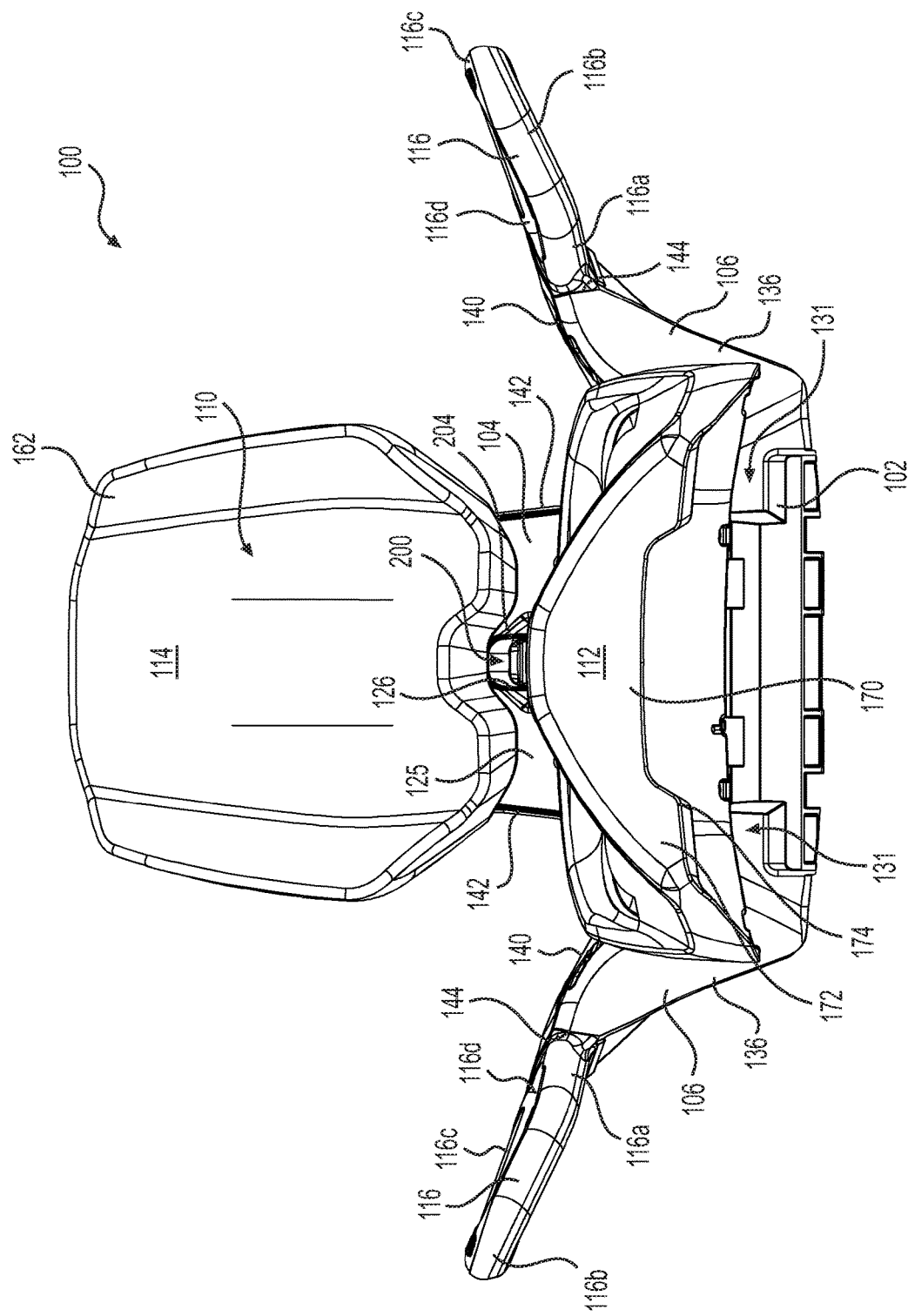
FIG. 3B is a front elevation view of the passenger seat of FIG. 3A.
Figure 3C:
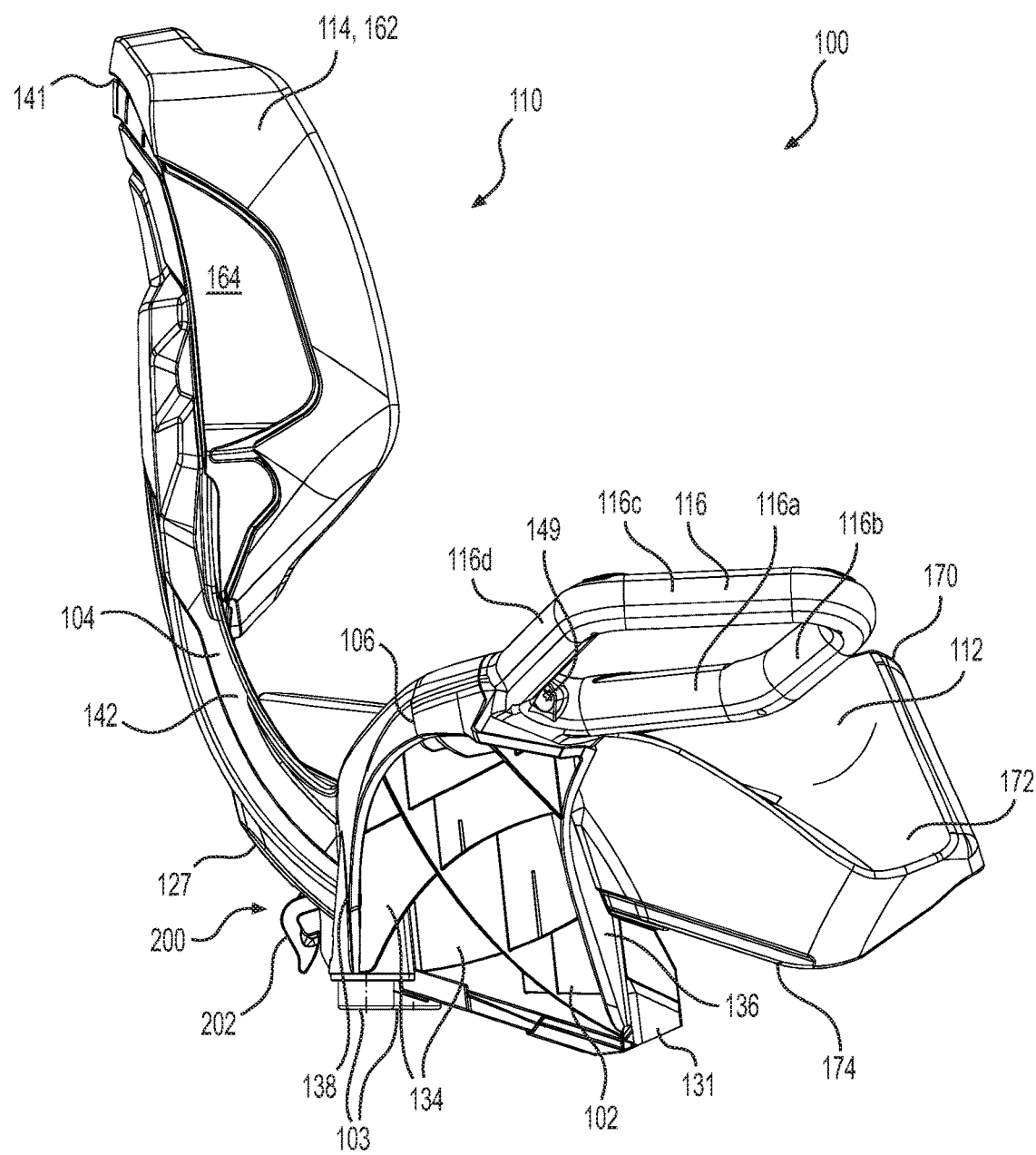
FIG. 3C is a right side elevation view of the passenger seat of FIG. 3A.
Figure 3D:
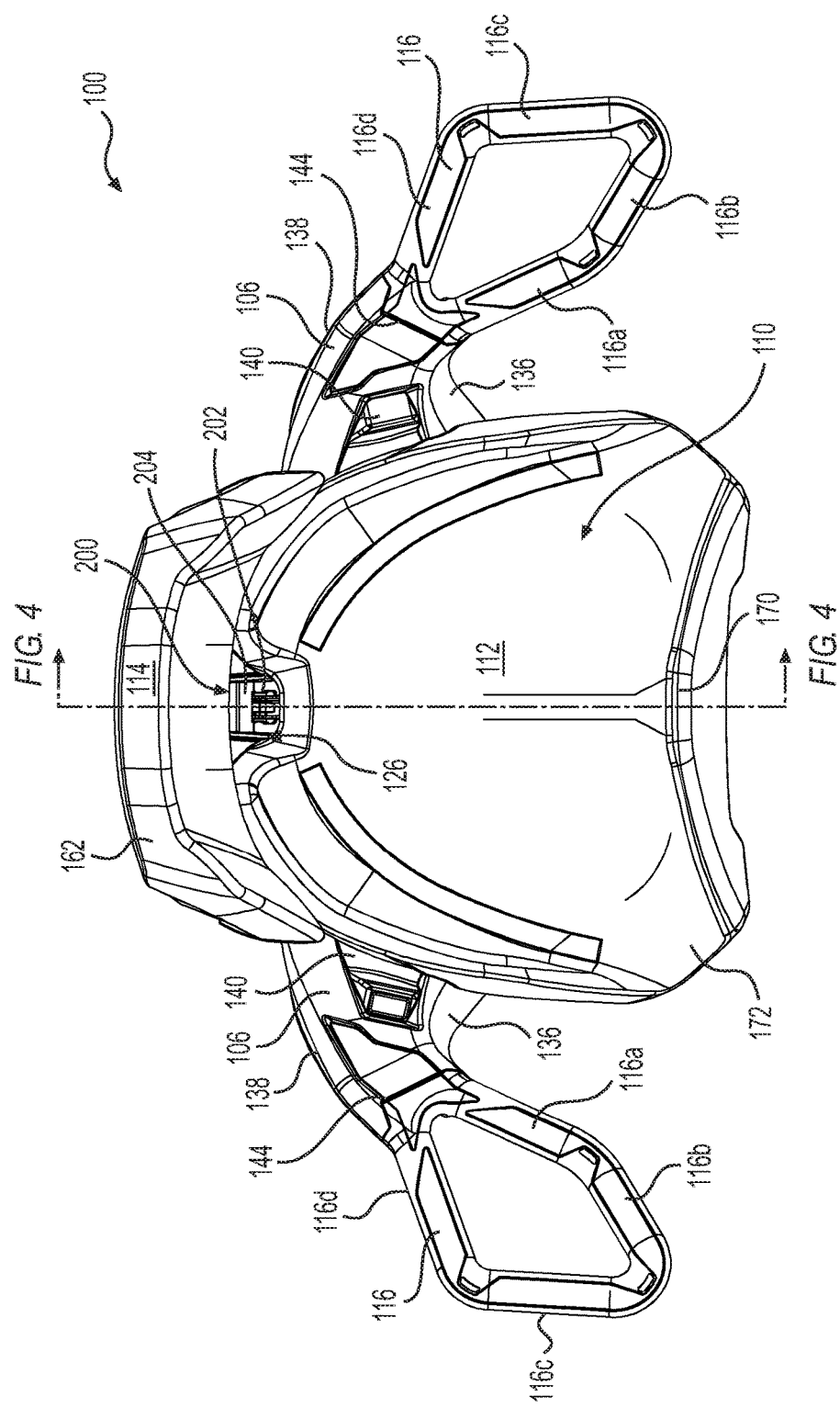
FIG. 3D is a top plan view of the passenger seat of FIG. 3A.
Figure 4:
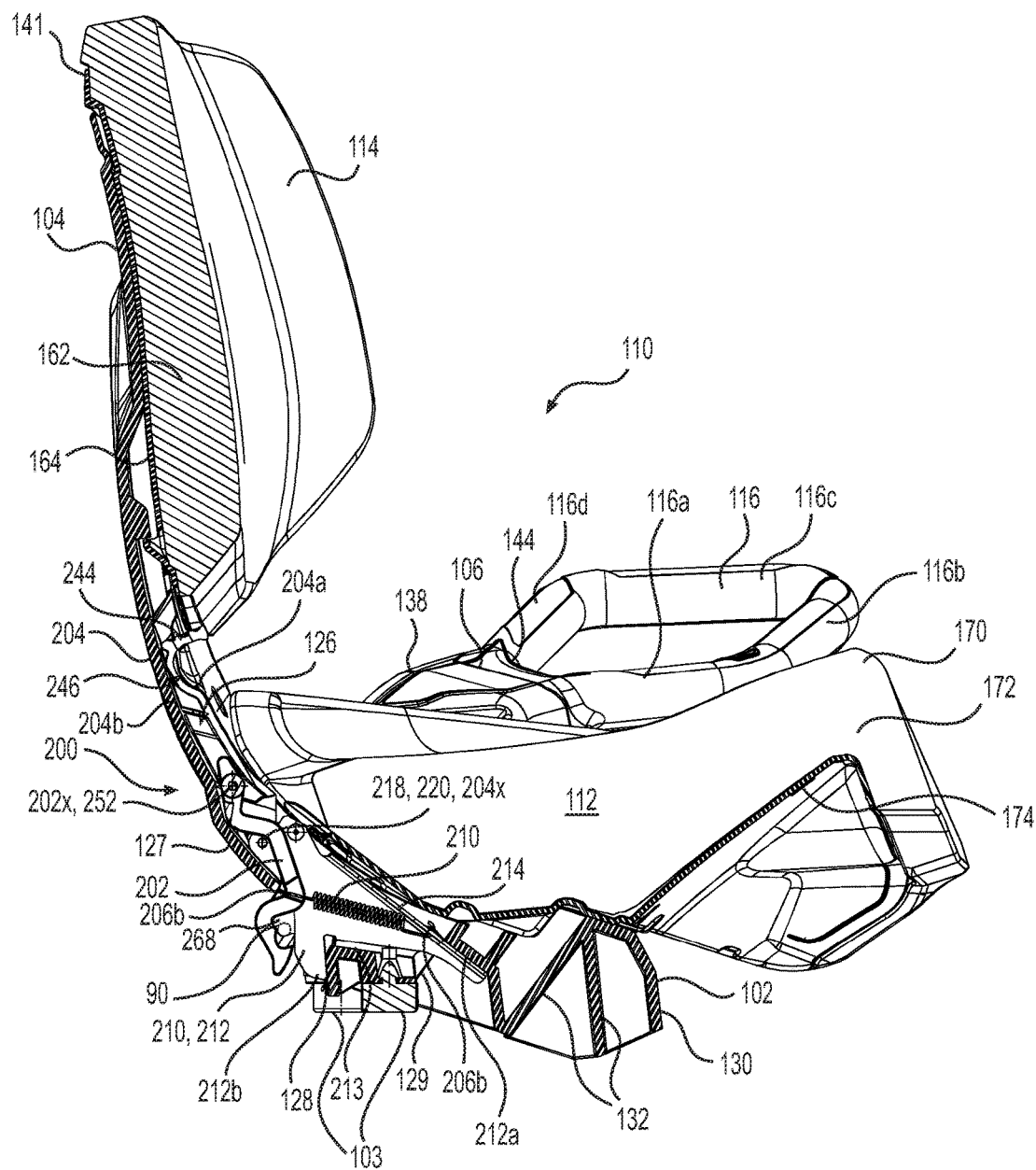
FIG. 4 is a cross-sectional view of the passenger seat of FIG. 3A taken along the line 4-4 of FIG. 3D.

With reference to FIGS. 3A to 4, the passenger seat 100 includes a base 102, a backrest 104 and a pair of handle mounting portions 106 formed integrally with each other. The base 102, backrest 104 and the handle mounting portions 106 are made of lightweight plastic but it is contemplated that they could be made of other suitable materials. A seat base cushion 112 is detachably connected to the base 102. A backrest cushion 114 is detachably connected to the backrest 104. It is contemplated that the seat base cushion 112 could be permanently connected to the base 102 and/or the backrest cushion 114 could be permanently connected to the backrest 104. It is also contemplated that the seat base cushion 112 and/or the backrest cushion 114 could be omitted. A handle 116 is detachably connected to each handle mounting portion 106. It is contemplated that each handle 116 could be formed integrally with the respective handle mounting portion 106. It is also contemplated that each handle 116 could be formed integrally with the base 102 and/or the backrest 104. It is also contemplated that each handle 116 could be connected to the spacer 82 or to a portion of the frame 12 such as the upper frame member 72.

With reference to FIGS. 5 to 8D, the base 102 extends generally horizontally. The base 102 extends rearwards from a front edge 130 to the backrest 104. The base 102 has an upper surface and a lower surface. The upper surface of the base 102 has a number of reinforcement ribs 132 extending laterally and longitudinally therealong. It is contemplated that the base 102 could define a number of channels and it is also contemplated that the ribs 132 could be omitted. When the seat 100 is installed on the vehicle 10, the lower surface of the base 102 is supported on the upper surface of the spacer 82. Three resilient spacers 103 (see FIGS. 3A, 3C), which in one implementation are made of rubber, are connected to the lower surface of the base 102. The spacers 103 are disposed between the base 102 and the spacer 82 when the seat is installed on the vehicle 10. The spacers 103 help reduce the transmission of vibration to the seat 100. In the illustrated embodiment of the seat 100, the front edge 130 of the base 102 is formed by a front wall that extends generally vertically and abuts against the vertical wall 82b of the spacer 82. As can be seen in FIGS. 6A to 6D, a left projection 131 extends leftwardly from the left end of the front wall 130 and a right projection 131 extends rightwardly from the right end of the front wall 130. The left and right projections 131 are respectively complementary to the left and right slots 82d formed at the left and right ends of the spacer wall 82b. The rear end of the base 102 abuts against the front surface of the brackets 92 at the rear end of the spacer 82. The base 102 is thus prevented from moving forward or rearward with respect to the spacer 82. The projections 131 being received in the spacer slots 82d prevent the front end of the base from lifting upwards away from the spacer 82. A latch mechanism 200 described below fastens the rear end of the base 102 to the spacer 82 preventing the seat 100 from lifting upwardly away from the spacer 82. It is contemplated that the projections 131 could be provided at the rear of the base 102 and that the latch mechanism 200 could fasten the front end of the base 102 to the spacer 82, with the spacer 82 being modified accordingly.

Figure 5:
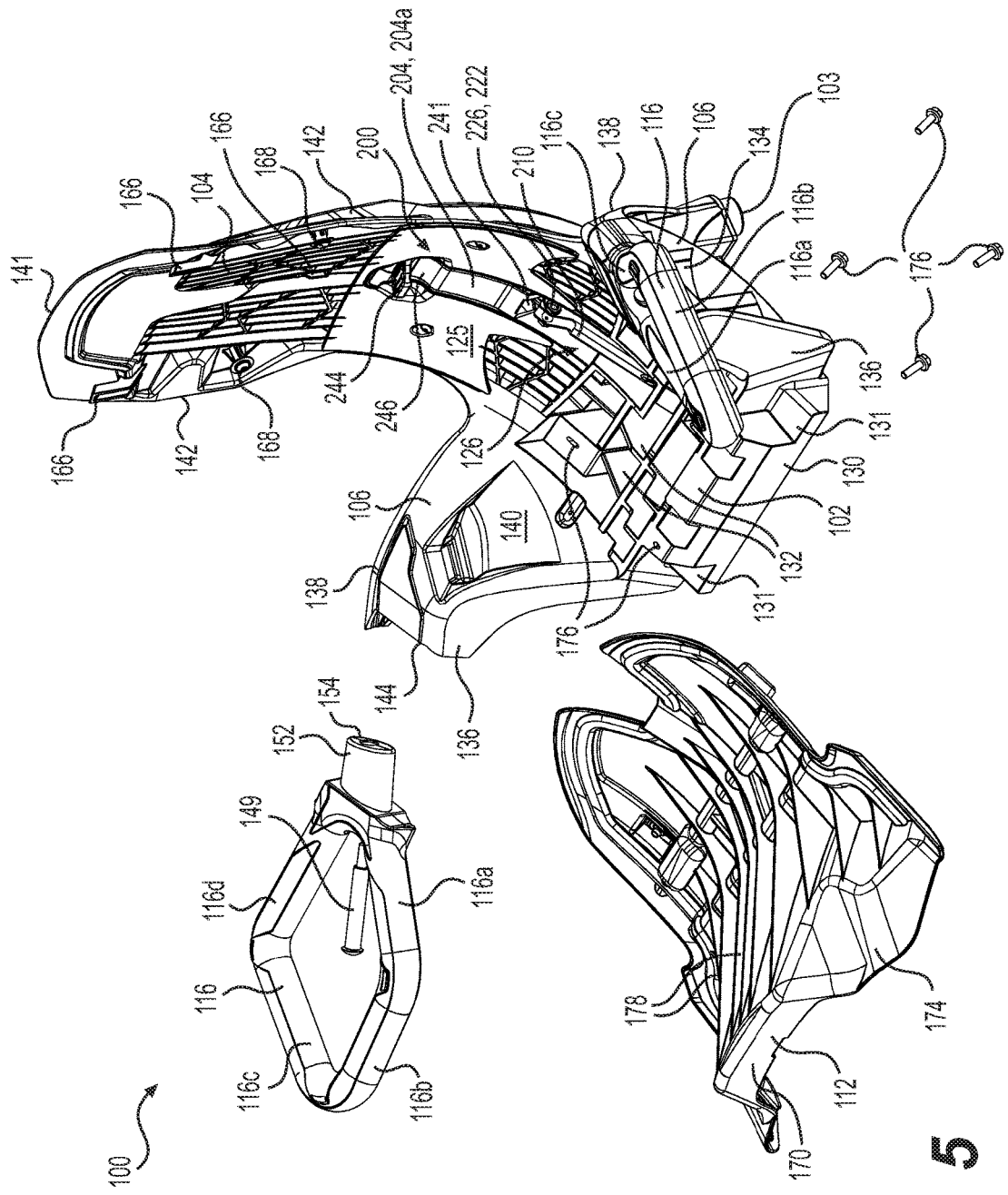
FIG. 5 is a partially exploded perspective view, taken from a front, left side, of the passenger seat of FIG. 3A with the seat base foam being removed from the seat base cushion and the backrest cushion being removed for clarity.
Figure 6A:
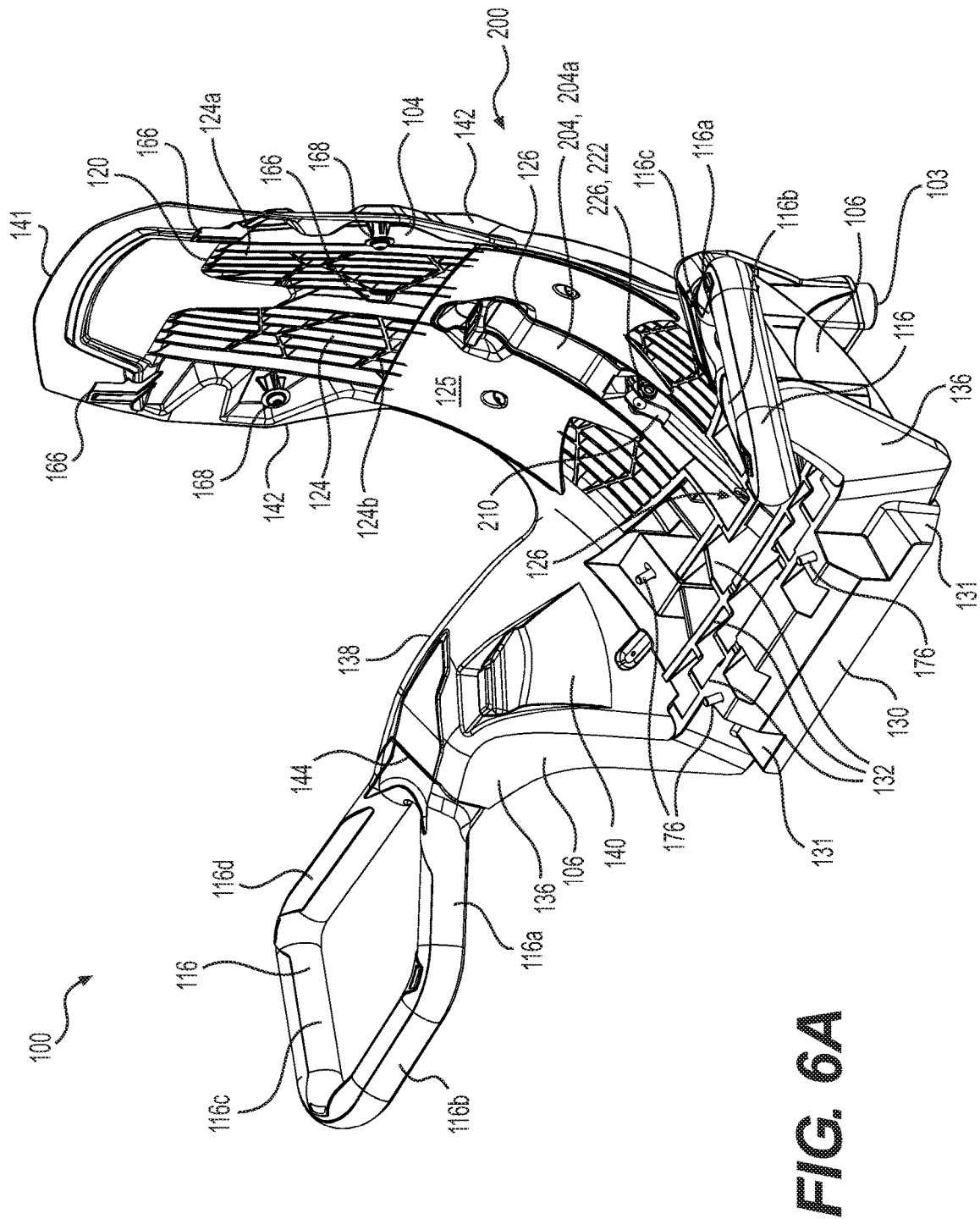
FIG. 6A is a perspective view, taken from a front, left side, of the passenger seat of FIG. 3A with the seat base cushion and the backrest cushion being removed for clarity.
Figure 6B:
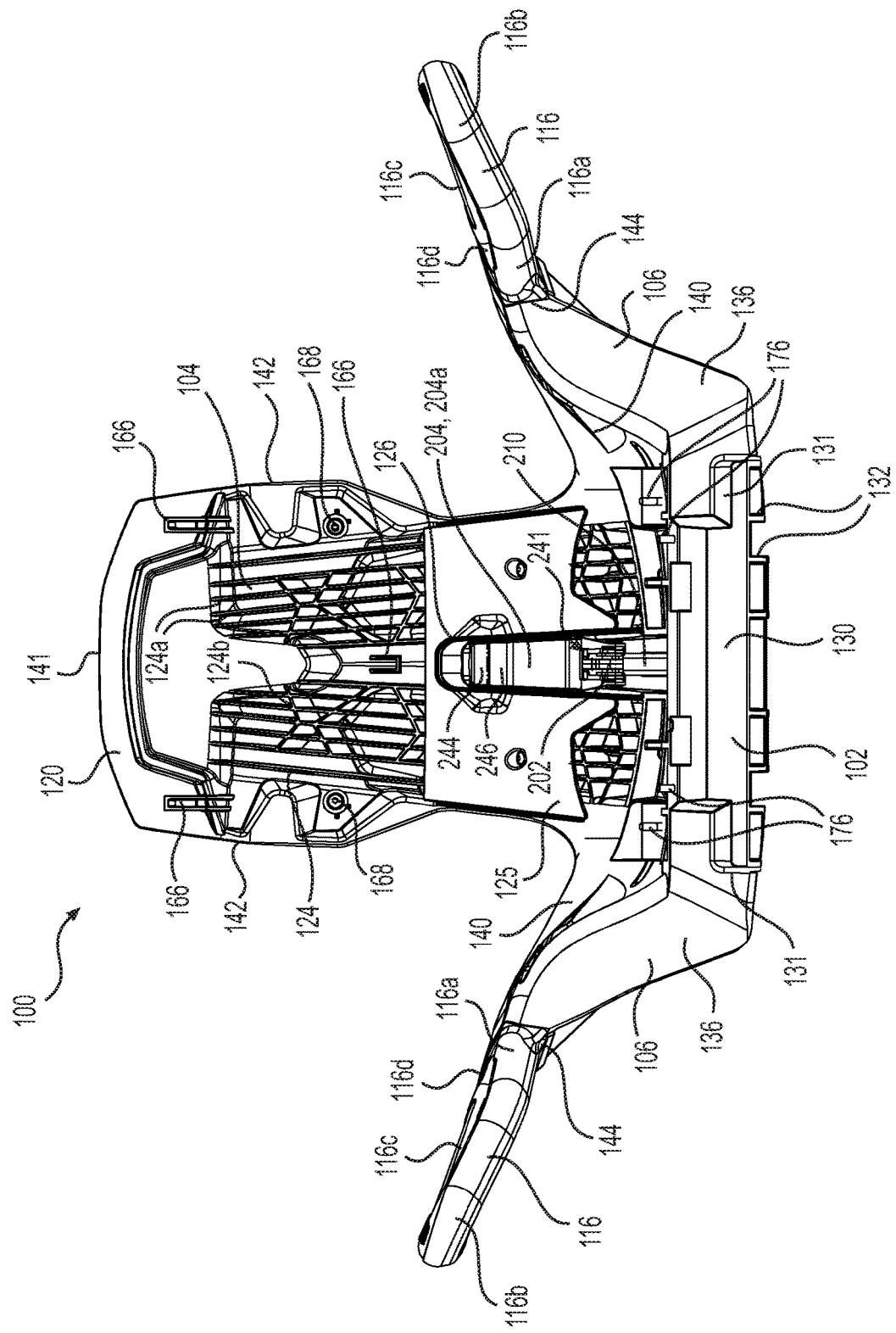
FIG. 6B is a front elevation view of the portions of the passenger seat of FIG. 6A.
Figure 6C:
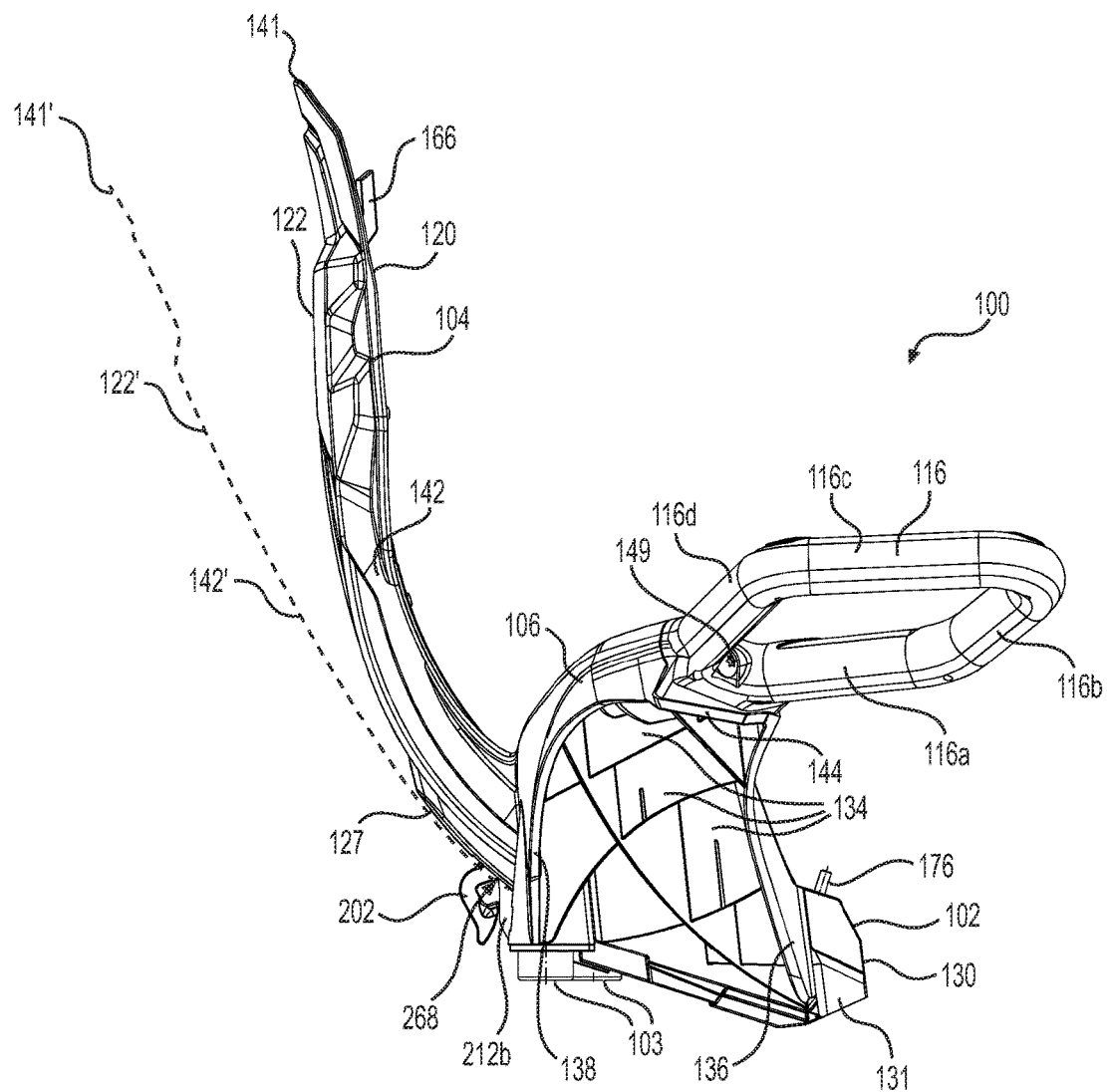
FIG. 6C is a right side elevation view of the portions of the passenger seat of FIG. 6A, showing in dotted lines the position of the backrest of the passenger seat in a flexed position.
Figure 6D:
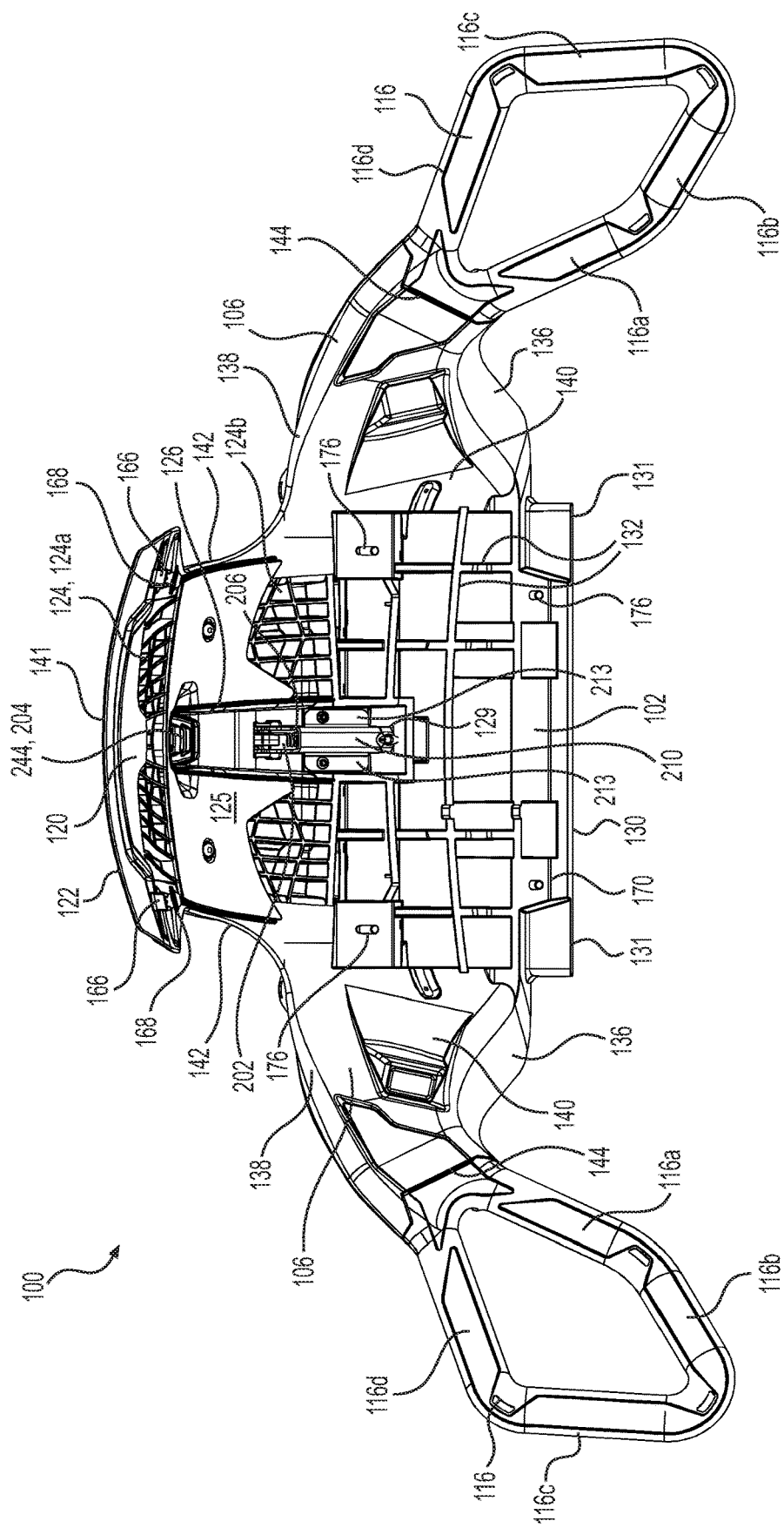
FIG. 6D is a top plan view of the portions of the passenger seat of FIG. 6A.
Figure 7A:
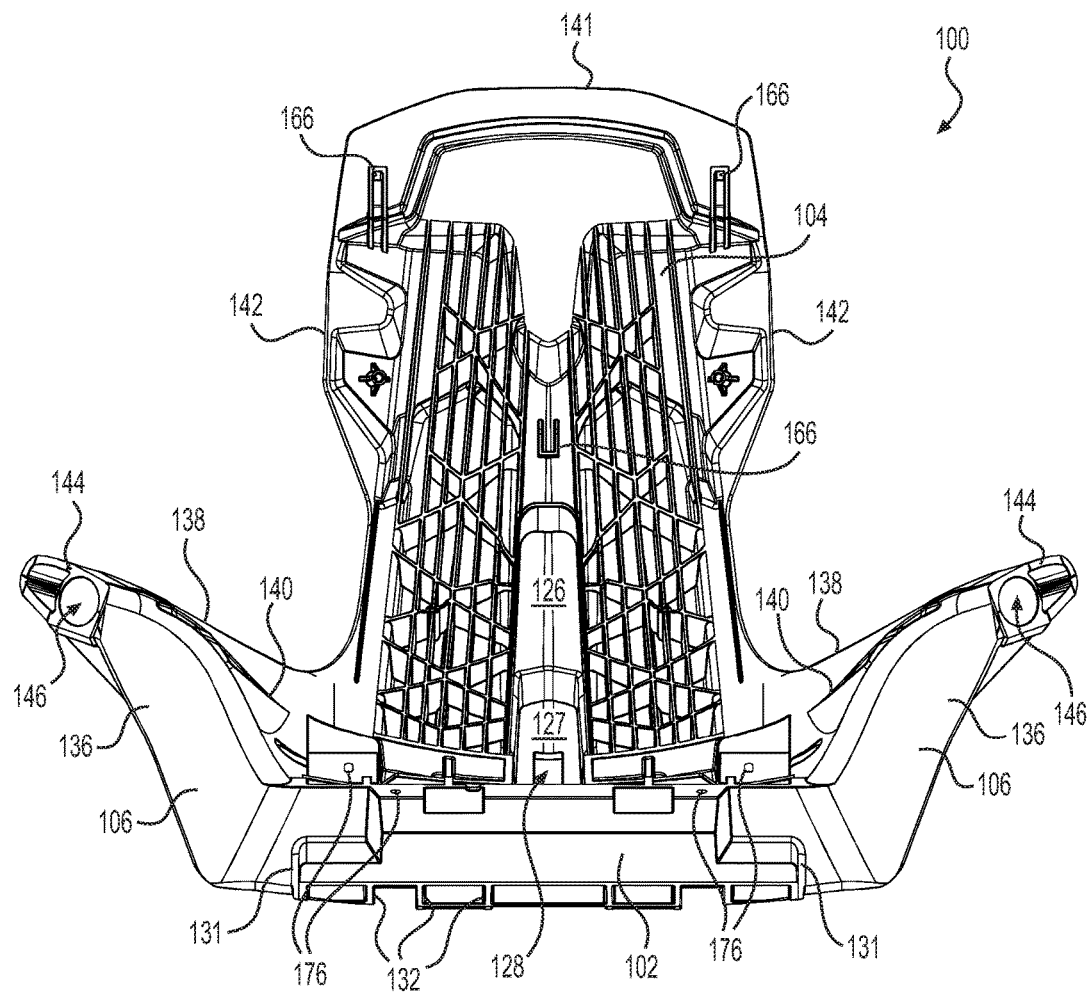
FIG. 7A is a front elevation view of the seat base, backrest and handle mounting portions of the passenger seat of FIG. 6A with the handles and the latch mechanism being removed for clarity.
Figure 7B:
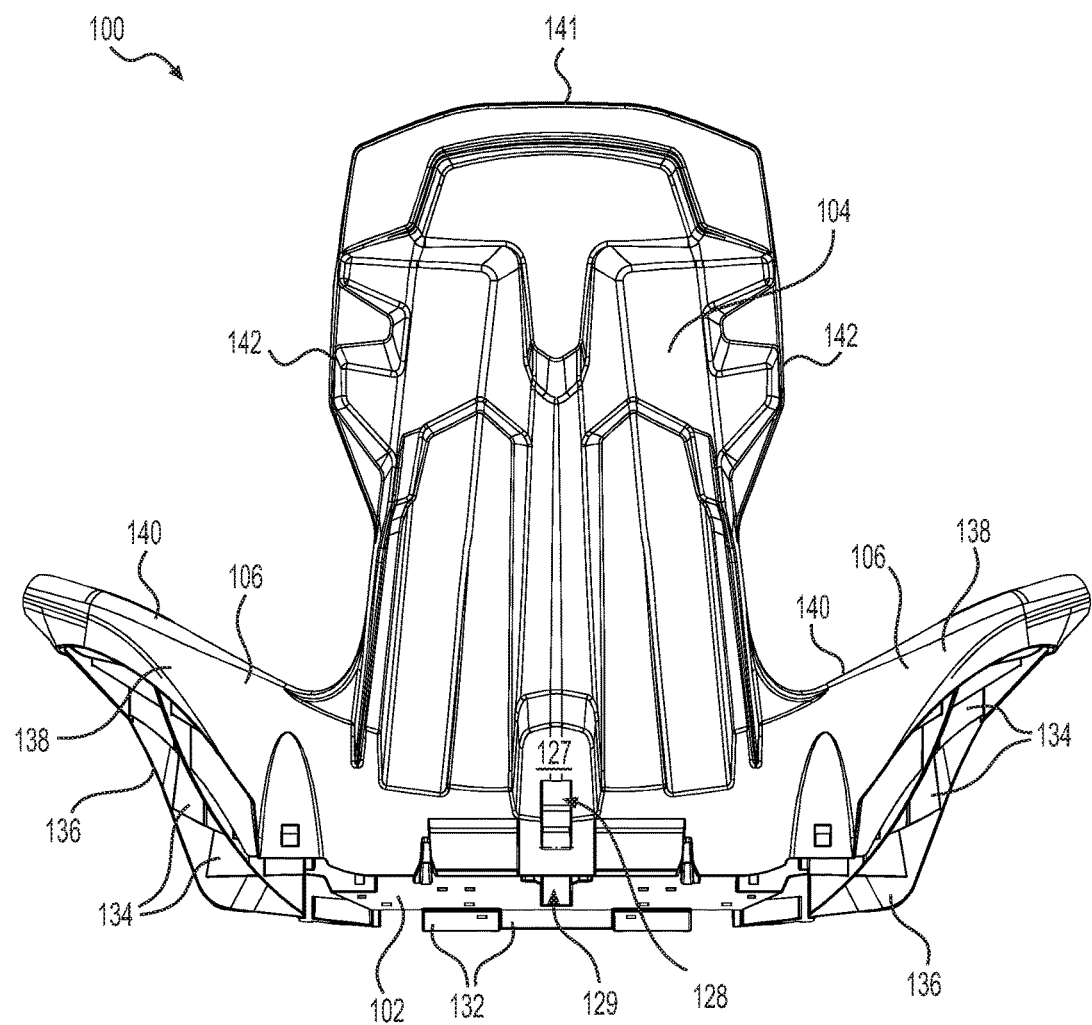
FIG. 7B is a rear elevation view of the seat base, backrest and handle mounting portions of FIG. 7A.
Figure 7D:
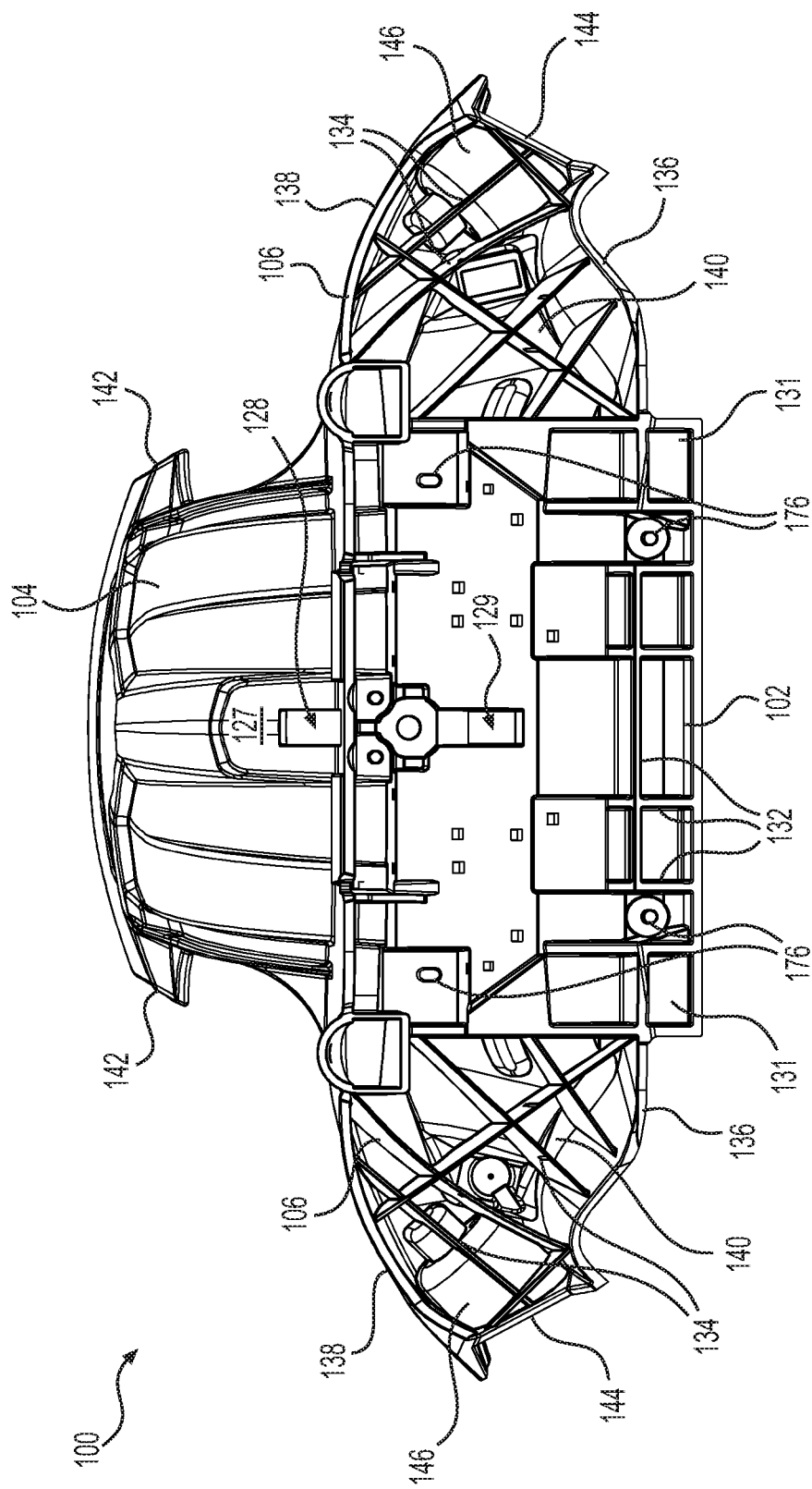
FIG. 7D is a bottom plan view of the seat base, backrest and handle mounting portions of FIG. 7A.

With reference to FIGS. 5 to 6D, the junction between the base 102 and the backrest 104 is curved. The backrest 104 extends generally vertically from the base 102 to a top edge 141. The top edge 141 is disposed higher than the handles 116. When viewed from a lateral side as in FIG. 6C, the backrest 104 curves gently rearwardly as it extends upwards away from the base 102 to the top edge 141. The backrest 104 has a left edge 142 and a right edge 142. The lateral spacing between the left and right edges 142 is greater in the upper portion of the backrest 104 than in the lower portion of the backrest 104. It is contemplated that the lateral spacing between the left and right edges 142 could be the same along the entire backrest 104 or could vary differently than illustrated. When viewed from the top as in FIG. 6D, the backrest 104 curves gently forwardly from its lateral center towards each of the left and right edges 142.

With reference to FIGS. 5 to 6D, the backrest 104 has a front surface 120 facing towards the front edge 130 of the base 102 and the front 2 of the ATV 10. The backrest 104 has a rear surface 122 opposite the front surface 120. Several ribs 124a, 124b are formed on the front surface 120. Ribs 124a extend vertically along the front surface 120. Ribs 124b extend laterally in a crisscrossing pattern across the length and width of the longitudinal ribs 124a. The ribs 124a, 124b provide structural reinforcement while allowing flexing of the backrest 104 in a rearward direction. As can be seen in FIGS. 6C and 7C, the backrest 104 flexes progressively in both the vertical and lateral directions.

With reference to FIG. 6C, when a passenger seated on the seat 100 pushes rearwards against the backrest 104, for example during acceleration of the vehicle 10, the backrest 104 vertically progressively flexes to a flexed position (dotted lines show flexed position 122' of rear surface 122). The vertically progressive flexing can be described with respect to a displacement angle. The displacement angle for any point along the rear surface can be described in terms of the angle between the tangent extending through the point in its unflexed position and the tangent extending through the point in its flexed position. When viewed from a side, the backrest 104 flexes such that the upper edge 141 is displaced rearwards from its unflexed position 141 to its flexed position (141') by a greater angle than any other portion of the backrest 104. The angle of rearward displacement of the backrest 104 between the unflexed and flexed positions decreases from the upper edge 141 towards the base 102. For example, the bottom portion of the backrest 104 just above the opening 128 through which the hook 202 extends is displaced by an angle of 5° between its unflexed and flexed positions while the top edge 141 displaces by an angle of 20° from it unflexed position (141) to its flex position (141').

With reference to FIG. 7C, when a passenger seated on the seat 100 leans to their right, for example, when the vehicle 10 is executing a sharp right turn, the backrest 104 flexes laterally progressively to a flexed position (dotted lines show flexed position 141' of the top edge 141 of the rear surface 122). In the unflexed position of the rear surface top edge 141, its left and right edges 142 are disposed longitudinally forward of a tangent 143 extending through its lateral center 121. In the laterally progressively flexed position, the entire rear surface top edge 141' is displaced longitudinally rearward of its unflexed position 141, however, the rearward displacement of the right edge 142' is greater than the rearward displacement of the lateral center 121' which is greater than the rearward displacement of the left edge 142. Furthermore, the laterally progressive flexing of the backrest 104 deforms the shape of the top edge 141 such that the right edge 142' is disposed relatively closer to the tangent 143' extending through the lateral center 121' of the flexed top edge 141' than in its unflexed position (with the distance from the tangent 143' being measure in the direction perpendicular to the tangent 143'). Also, the upper portion of the backrest 10 flexes more than the lower portion of the backrest 10.

When a passenger seated on the seat 100 leans to their left, for example, when the vehicle 10 is executing a sharp right turn, the backrest 104 flexes laterally progressively to a flexed position that would be a mirror image of the position shown in dotted lines in FIG. 7C. As such, this leftward flexing position will not be described herein again.

With reference to FIGS. 7A to 7D, a slot 126 is defined in the seat 100. The slot 126 is defined in the upper surface of the base 102 and the front surface 120 of the backrest 104. The slot 126 extends along the lateral center of the seat 100. The slot 126 extends rearwards from the rear portion of the base 102 and then upwards along the backrest 104 to a middle portion of the backrest 104. The upper end of the slot 126 is disposed above the handle mounting portions 106 as can be seen when viewed from the front as in FIG. 7A. The handle mounting portion 106 extends rearward of the front end of the slot 126 when viewed from the top as in FIGS. 6D and 7C. The slot 126 houses the latch mechanism 200 as can be seen in FIGS. 4 to 6D.

As can be seen best in FIGS. 4 and 7A to 7C, the inner surface of the slot 126 is recessed in a lower portion of the backrest 104 just above the base 102. When viewed from the rear (FIG. 7B) or a side (FIGS. 4 and 6C), the recessed portion 127 of the slot 126 projects out from the rear surface 122 of the backrest 104.

As can be seen best in FIGS. 4, and 7A to 7C, the slot 126 also has rectangular openings 128, 129. The opening 128 is formed in the lower portion of the backrest 104 just above the base 102. The opening 128 is partly in the recessed portion 127 of the slot 126 and extends from the inner surface of the slot 126 to the rear surface 122 of the backrest 104. A portion of a hook 202 of the latch mechanism 200 extends through the opening 128 to be disposed rearward of the backrest 104. The opening 129 is defined in the front portion of the slot 126 disposed in the base 102. The opening 129 extends through the inner surface of the slot 126 to the lower surface of the base 102. The openings 128, 129 are laterally centered in the slot 126 and laterally aligned with one another.

As can be seen in FIGS. 3A to 5, a backrest cushion 114 is attached to the front surface 120 in the upper portion of the backrest 104. The backrest cushion 114 extends over the top edge 141 of the backrest 104 and around the left and right edges 142. The backrest cushion 114 includes a foam portion 162 surrounded by a protective cover and supported by a backrest cushion frame 164. The front surface 120 has three hooks 166 projecting outwardly. A lower hook 166 (FIG. 5) is disposed along the lateral center and extends downwardly. An upper left hook 166 is formed just below the top edge 141 and near the left edge 142, and an upper right hook 166 is formed just below the top edge 141 and near the right edge 142. The hooks 166 are inserted into complementary tabs (not shown) formed in the backrest cushion frame 164. Two bolts 168 (FIG. 5) are inserted through the backrest 104 and the backrest cushion frame 164 including one bolt 168 below each hook 166. The backrest cushion frame 164 is thus removably fastened to the backrest 102 by the hooks 166 and the bolts 168. The backrest cushion 114 can thus be replaced when desired, for example, if the foam 162 becomes worn, dirty or damaged. It is contemplated that the bolts 168 could be omitted.

With reference to FIGS. 3A to 4, a seat base cushion 112 is disposed over the base 102. The seat base cushion 112 includes a foam portion 172 surrounded by a protective cover and supported by a seat base cushion frame 174. The seat base cushion 112 extends to the backrest 104 and forward of the front edge 130. The seat base cushion 112 is removably fastened to the base 102 by bolts 176 inserted through the base 102 into the seat base cushion frame 174. It is contemplated that the seat base cushion 112 could be fastened to the base 102 by other means such as by hooks for example. The seat base cushion frame 174 has several reinforcing ribs 178. At the front edge, the seat base cushion 112 has a raised middle portion 170 between the left and right sides of the base 102. The raised portion 170 is disposed on the rear end of the driver seat 28 as can be seen in FIG. 2A. At the rear end, the seat base cushion 112 rises upwards on the left and right sides of the slot 126. The seat base cushion 112 is recessed in the middle portion of the rear edge to allow access to the latch mechanism 200.

With reference to FIGS. 3A to 3D and 5, a removable cover 125 is placed over the ribs 124a, 124b in the middle portion of the backrest 104 which is exposed between the seat base cushion 112 and backrest cushion 114. The cover 125 extends above the slot 126 and on either side thereof. The cover 125 is removably fastened to the backrest 104 by two bolts 125a. The cover 125 has a smooth front surface which provides a more aesthetically pleasing surface than the ribs 124a, 124b, while also protecting the passenger seated on the seat 100 from inadvertent contact with the ribs 124a, 124b, and dust and debris from collecting between the ribs 124a, 124b. It is contemplated that the cover 125 could be omitted as in the seat 100 shown in FIG. 8A.

With reference to FIGS. 3A to 8B, the left handle mounting portion 106 extends leftwardly and upwardly from the left side of the base 102 just rearward of the front edge 130. The right handle mounting portion 106 extends rightwardly and upwardly from the right side of the base 102 just rearward of the front edge 130. The left handle mounting portion 106 is a mirror image of the right handle mounting portion 106 and as such, only the right handle mounting portion 106 will be described herein.

With reference to FIGS. 7A to 8B, the right handle mounting portion has a front wall 136, a rear wall 138 and a top wall 140 extending between the top edges of the front and rear walls 136, 138. The front wall 136 is connected to the right edge of the base 102 just rearward of the front edge 130. The front wall 136 extends rightwardly from the right edge of the base 102, and then upwardly and rearwardly. The rear wall 138 extends continuously from a right edge 142 of the backrest 104. The rear wall 138 extends rightwardly, upwardly and forwardly from the right edge 142 of the backrest 104. As best seen in FIG. 7D, the right handle mounting portion 106 has a number of ribs 134 extending downwardly from the lower surface of the top wall 140.

Figure 8A:
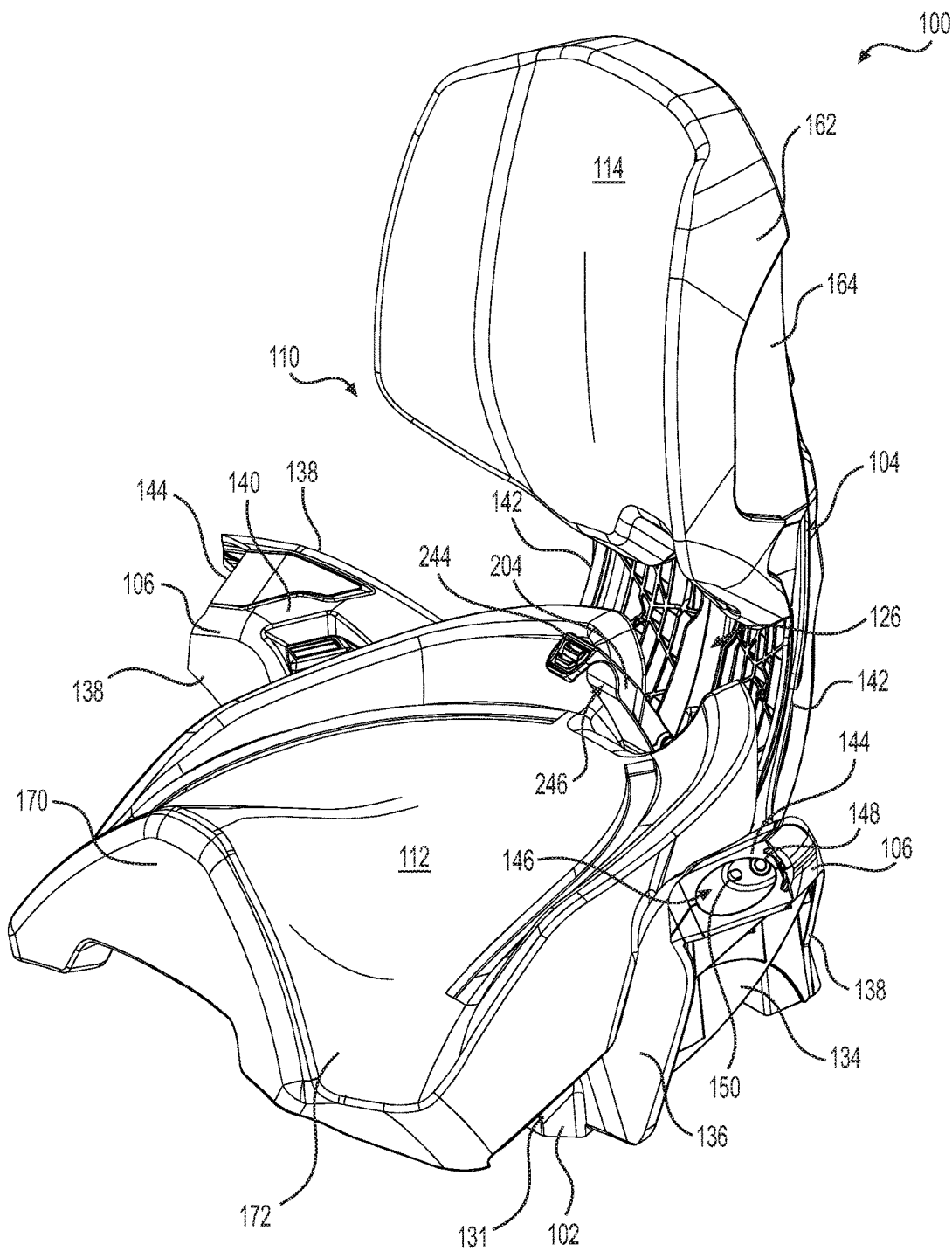
FIG. 8A is a perspective view, taken from a front, left side, of the passenger seat of FIG. 3A with the latch mechanism in an unlatched and disengaged position and the handles being removed for clarity.
Figure 8B:
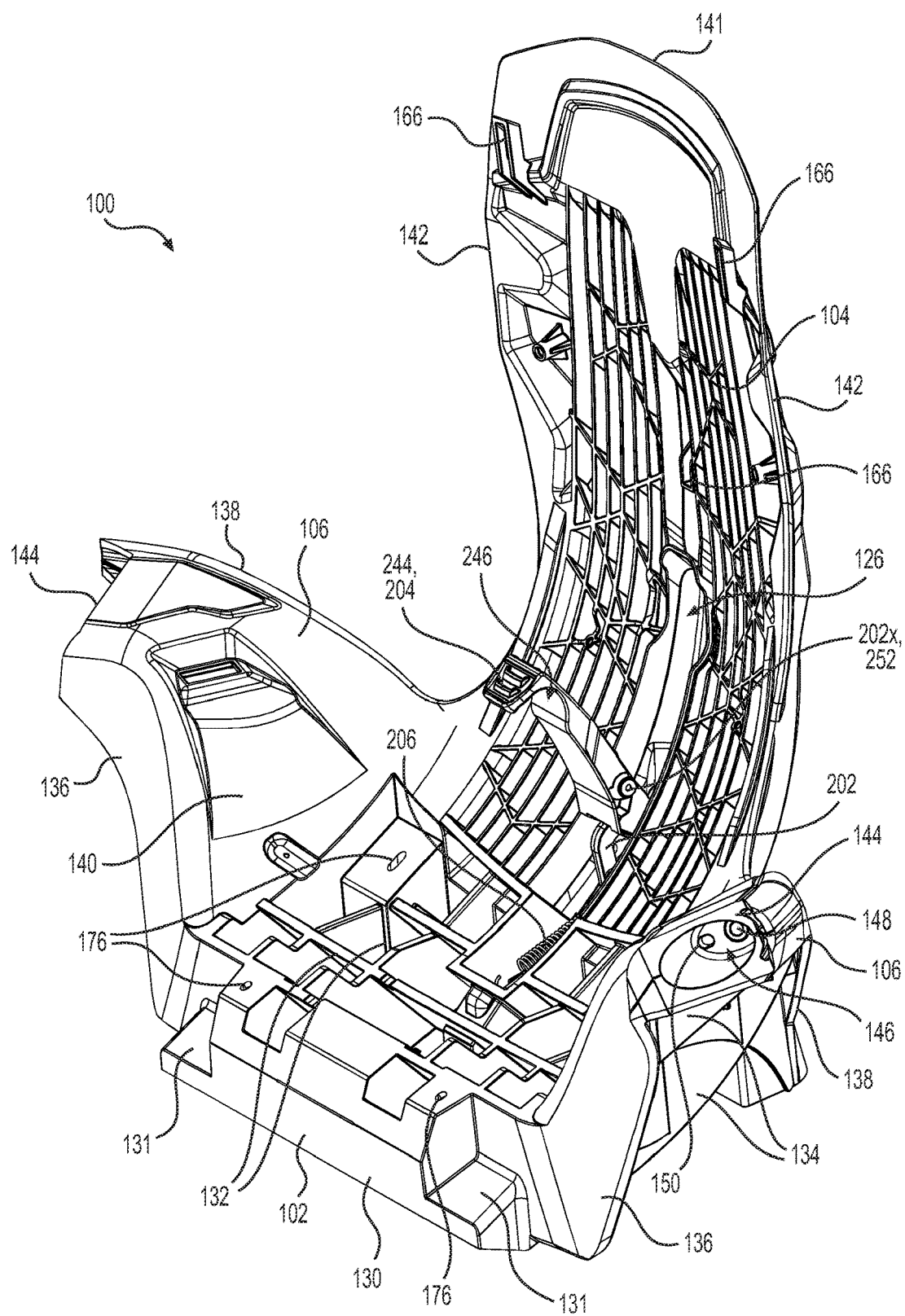
FIG. 8B is a perspective view, taken from a front, left side, of the passenger seat of FIG. 8A with the seat base cushion, the backrest cushion and a portion of the latch mechanism removed for clarity.

With reference to FIGS. 8A and 8B, at the outer ends, the front and rear walls 136, 138 are connected together by an outer wall 144. A recess 146 extends inwardly into the outer wall 144. Two openings 148, 150 extend through the inner wall of the recess 146. The opening 148 is threaded and receives a bolt 149 (FIG. 6C) which fastens the right handle 116 to the right handle mounting portion 106. A heater wire (not shown) is inserted through the other opening 150 and connects to a heater element (not shown) embedded inside the right handle 116 for heating the right handle 116. It is contemplated that the opening 150 could be omitted and the heater wire could be extended via a different location to the handle 116, or that the handle 116 could not be a heated handle 116.

With reference now to FIGS. 3A to 6D, the right handle 116 will now be described. The left handle 116 is a mirror image of the right handle 116 and as such only the right handle 116 will be described herein. The right handle 116 has a base 152 (FIG. 5), a lower front arm 116a, an upper front arm 116b, an upper rear arm 116c, and a lower rear arm 116d. An opening 154 (FIG. 5) extends through the base 152 between the lower arms 116a, 116d. The base 152 is received in the recess 146 of the handle mounting portion 106 such that the opening 152 is aligned with opening 150. The bolt 149 is inserted through the openings 154 into the threaded opening 150 to fasten the handle 116 to the handle mounting portion 106. When the handle 116 is installed on the handle mounting portion 116, the lower front arm 116a extends rightwardly, forwardly and upwardly from the handle base 152, the upper front arm 116b extends rightwardly, upwardly and rearwardly from the lower front arm 116a, the upper rear arm 116c extends downwardly, leftwardly and rearwardly from the upper front arm 116b, and the lower rear arm 116d extends downwardly, leftwardly and forwardly from the upper rear arm 116c to the base 152.

The seat base cushion 112, the backrest cushion 114 and the handle mounting portions 106 define a seating space 110 disposed above the seat base cushion 112 and longitudinally forward of the backrest cushion 114. When a passenger is seated on the seat base cushion 112, at least a portion of the passenger's torso is disposed in the seating space 110. The passenger's legs extend forward of the seat base cushion 112 on either side and downward to the passenger footrests 52. The passenger's head is intended to be disposed above the top edge 141 of the backrest 104 and above the backrest cushion 114. It is however contemplated that the backrest 104 could extend higher than as shown and the backrest cushion 114 could support the passenger's head or a portion thereof. It is also contemplated that the shape of the base 102 and/or the backrest 104 could be different than as shown herein.

The latch mechanism 200 will now be described with reference to FIGS. 9A to 10D. The latch mechanism 200 includes a hook 202 that selectively engages the spacer rod 90 to fasten the seat 100 to the vehicle 10. The hook 202 is connected to a latch release handle 204 which can be pivoted to move the hook 202 for engaging and disengaging the rod 90 as will be described below. The latch release handle 204 is mounted to the seat 100 via a latch mounting member 210.

With reference now to FIGS. 9A to 10D, the latch mounting member 210 includes two spaced apart lateral plates 212 connected together by a front plate 214. The left and right lateral plates 212 are mirror images of each other and as such, only the right lateral plate 212 will be described herein. The front edge of the right lateral plate 212 extends rearwards and upwards from a lower end portion 212a to an upper portion 212c. The front plate 214 extends laterally between the front edges of the left and right plates 212. The front plate 214 extends upwards from the front lower end portions 212a towards the upper portions 212c. The lateral plates 212 and the front plate 214 define a slot 211 that is open towards the rear and bottom of the seat 100.

With reference to FIGS. 9A to 10D, the outer surface (right facing surface) of the right lateral plate 212 has a circular protrusion 222 extending rightwardly (laterally outwardly) therefrom. The circular protrusion 222 is disposed in the upper portion 212c near the front edge of the right plate 212. In the illustrated embodiment, the protrusion 222 is formed by pressing the plate 212, resulting in a corresponding recess 222' (FIGS. 10A to 10D) on the inner surface of the plate 212 (i.e. surface facing the slot 211). It is contemplated that the protrusion 222 could be formed differently than as shown, and that the inner surface could not have the recess 222'.

With reference to FIGS. 9A to 10D, a circular through-hole 218 (FIGS. 10A to 10D show the hole 218 of the left plate 212) extends through the upper portion of the plate 212 rearward of the protrusion 222. A semi-tubular rivet 220 is inserted through the hole 218 to pivotally connect the latch release handle 204 to the latch mounting member 210.

With reference to FIGS. 9A to 10D, the rear edge of the plates 212 curves downwards and forwards below the hole 218 to a lower end portion 212b. At the bottom edge, the right plate 212 has a flange 213 extending rightwardly (laterally outwardly) between the front and rear lower end portions 212a, 212b. The lower end portions 212a, 212b extend vertically lower than the flange 213. As can be seen best in FIG. 6D, the flange 213 is placed on the inner surface of the slot 126 between the openings 128 and 129, and fastened thereto by a bolt inserted through the flange 213 into the slot surface 126. As can be seen in FIG. 4, the front lower portion 212a extends through the front opening 129 and the rear lower portion 212b extends through the rear opening 128.

With reference to FIGS. 9A to 10D, the front plate 214 has an opening 216 disposed slightly higher than the flanges 213. A lip is formed around the upper periphery of the opening 216. A front end 206a of a spring 206 is connected to the plate 214 around the lip of the opening 216. The spring 206 extends rearward in the slot 211 between the lateral plates 212. The rear end 206b of the spring 206 is connected to the hook 202.

Figure 9A:
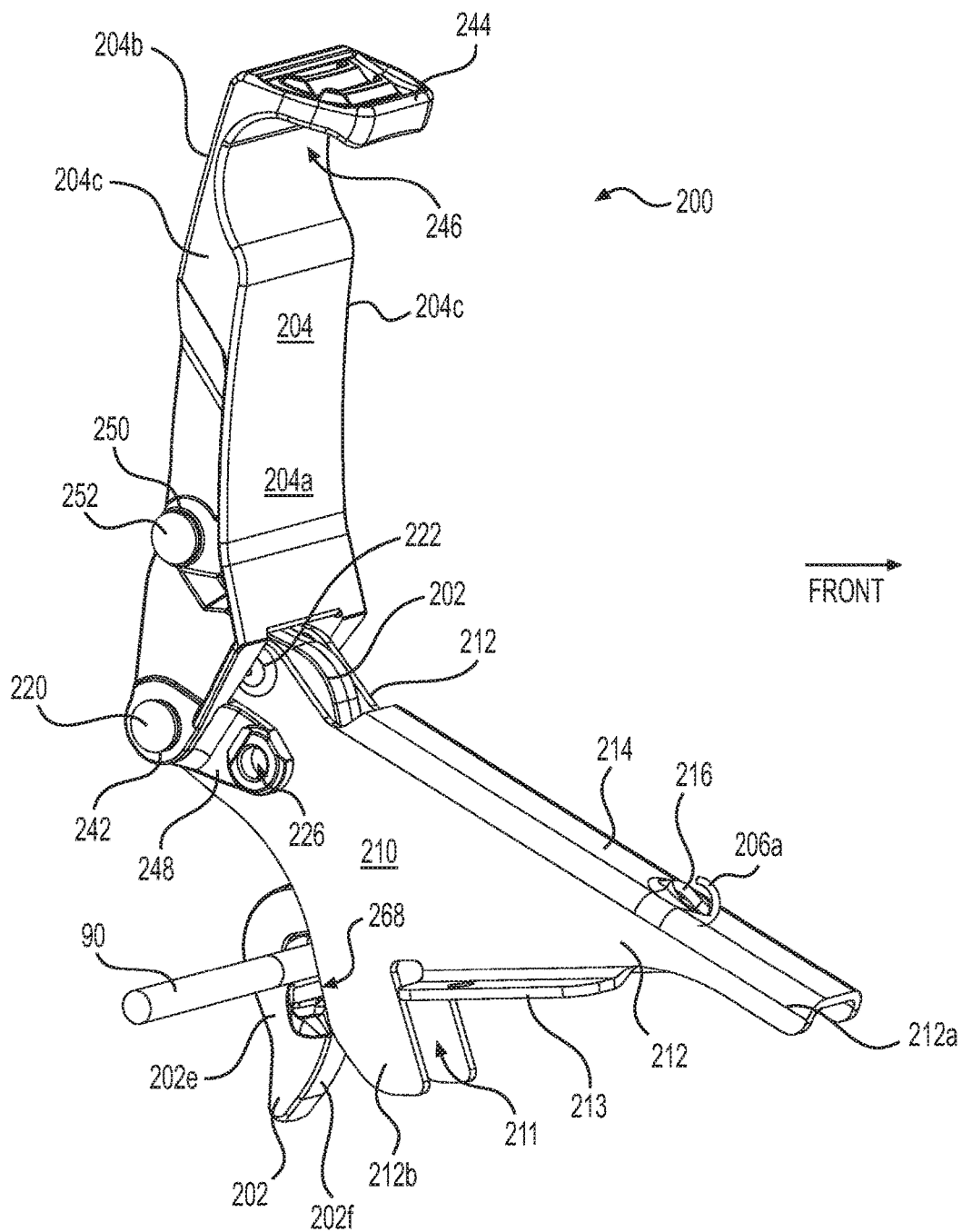
FIG. 9A is a perspective view, taken from a front right side, of the latch mechanism of the passenger seat of FIG. 3A.
Figure 9B:
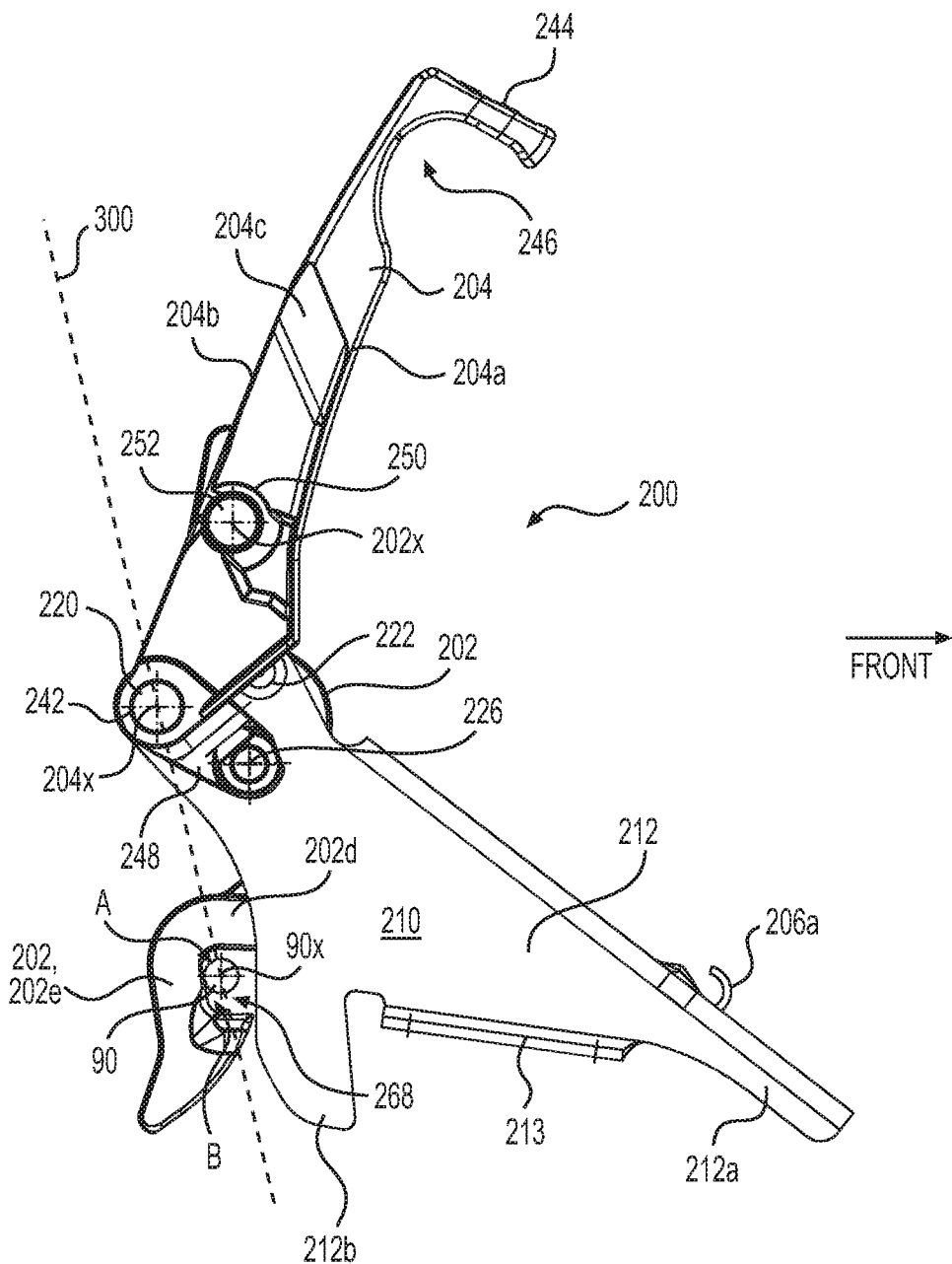
FIG. 9B is a right side elevation view of the latch mechanism of FIG. 9A.
Figure 10A:
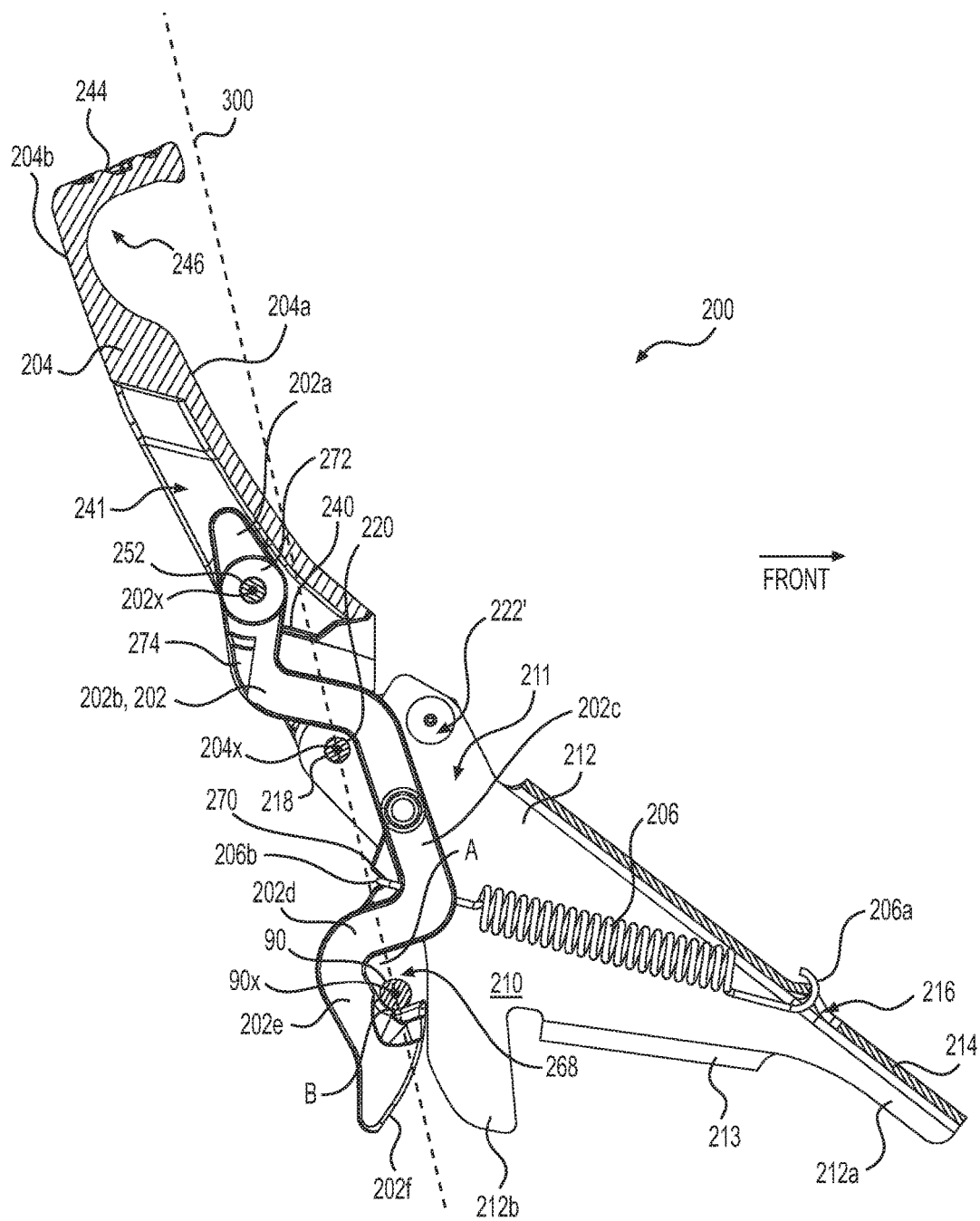
FIG. 10A is a cross-sectional view of the latch mechanism of FIG. 9A, taken along the line 4-4 of FIG. 3D, with the latch mechanism disposed in a latched and engaged position.

With reference to FIGS. 9A, 9B and 10A, the release handle 204 extends upwards from the latch mounting member 210. The release handle 204 has a front surface 204a, a rear surface 204b and lateral surfaces 204c. The upper end of the release handle 204 has a flange 244 extending forwardly therefrom. The front surface 204a curves rearwards towards the rear surface 204b just below the flange 244 to form a generally-semi-circular groove 246. The upper surface 244a of the flange 244 facing upwards and away from the groove 246 is ribbed to facilitate gripping.

With reference to FIG. 10A, the latch release handle 204 defines a slot 241 extending into the rear surface 204b. The slot 241 extends in the middle and lower portions of the release handle 204. In the lower portion of the release handle 204, the slot 241 extends through the front surface 204a.

Figure 9C:
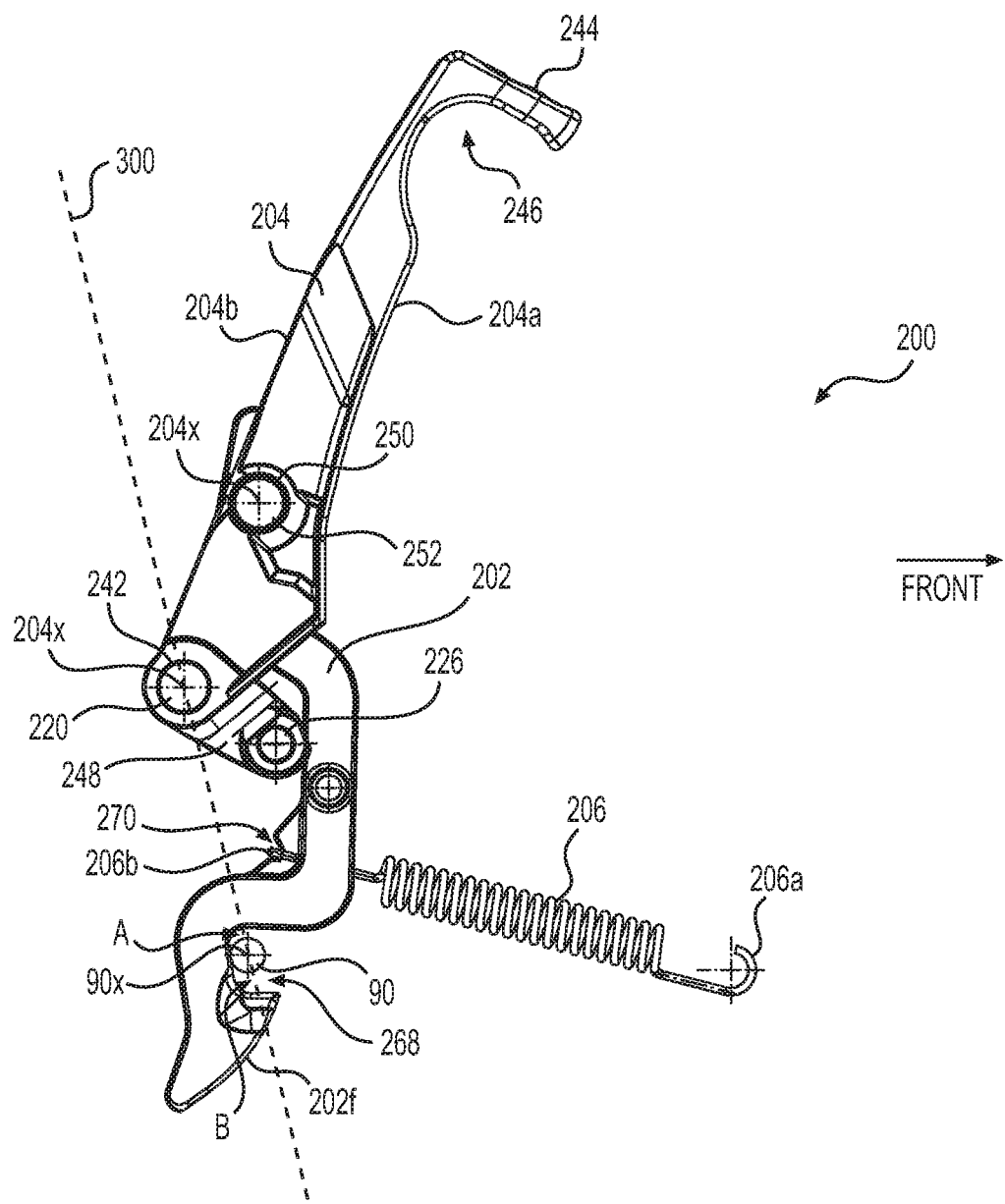
FIG. 9C is a right side elevation view of the latch mechanism of FIG. 9A with the latch mounting member being removed for clarity.

With reference to FIGS. 9A to 9C, at the lower end of the latch release handle 204, a hole 242 extends from each lateral surface 204c into the slot 241. As can be seen in FIGS. 10A to 10D, the upper portion of the latch mounting member 210 is disposed in the lower portion of the slot 241 so as to align the holes 218 of the lateral plates 212 with the holes 242 of the latch release handle 204. The semi-tubular rivet 220 is inserted through the aligned through-holes 218, 242 to pivotably connect the lower end of the release handle 204 to the latch mounting member 210. The latch release handle 204 can thus be pivoted in a forward and rearward direction about a pivot axis 204x defined by the semi-tubular rivet 220. The laterally extending pivot axis 204x is parallel to a central axis 90x of the rod 90.

With reference to FIGS. 9A to 9C, a flange 248 is connected to the lower end of the latch release handle 204 on each side of the slot 241 forward of the hole 242. Each flange 248 extends forwardly from the front surface 204a. The front end of each flange 248 has a through-hole 226 which can engage the protrusion 222 (as can be seen in FIGS. 5 and 6A) to prevent relative motion between the latch release handle 204 and the latch mounting member 210. This latched configuration of the latch release handle 204 will be discussed below in further detail with reference to FIG. 10A. It is contemplated that the position, shape and dimensions of the protrusion 222 and complementary hole 226 could be different than as shown herein.

With reference to FIGS. 9A to 9C, another through-hole 250 extends from each lateral surface 204c of the latch release handle 204 into the slot 241. The through-holes 250 are disposed above the holes 242 and used to connect the hook 202 to the latch release handle 204.

As can be seen in FIG. 10A, the latch release handle 204 has a projection 240 extending laterally inwardly from its inner lateral surface facing the slot 241. The projection 240 abuts a projection 274 of the hook 202 in order to pivot the hook 202 with the handle 204.

With reference to FIGS. 9A to 10D, the hook 202 is disposed in the slot 241 of the latch release handle 204 and in the slot 211 between the lateral plates 212 of the latch mounting member 210. As best seen in FIGS. 10A to 10D, the hook 202 is formed of portions 202a, 202b, 202c, 202d, 202e, 202f as described below. With regard to the orientation shown in FIG. 10A, the upper portion 202a extends downwardly in the slot 241 of the latch release handle 204. The portion 202b extends forwardly from the upper portion 202a into the slot 211 of the latch mounting member 210. The portion 202c extends downwardly in the slot 211 from the portion 202b to a portion 202d which extends rearwardly out of the slot 211. A portion 202e extends downwardly from the portion 202d. The front edge of the portion 202e extends downwardly from the portion 202d and then forwardly so as to form a generally C-shaped groove 268 with the portion 202d. The groove 268 is open towards the latch mounting member 210 and has an upper corner A and a lower corner B. The rod 90 is selectively received and retained in the groove 268 as will be explained below in further detail. A lower portion 202f of the hook 202 disposed below the groove 268 has a front edge that curves downward and rearwards away from the latch mounting member 210. During installation of the seat 100 on the vehicle 10, the curved front edge of the lower portion 202f allows the rod 90 to be engaged by the groove 268 by simply pushing the seat 100 down without actuating the latch release handle 204. A spring bracket having a notch 270 is connected to the rear edge of the hook 202 at the corner formed by the hook portions 202c and 202d. The rear end 206b of the spring 206 is hooked to the notch 270.

The upper hook portion 202a has a through-hole 272 which is aligned with the holes 250 of the latch release handle 204. A semi-tubular rivet 252 inserted through the aligned openings 272, 250 to pivotally connect the hook 202 to the latch release handle 204. The hook 202 is pivotable in a forward and rearward direction with respect to the latch release handle 204. The hook 202 pivots about a hook pivot axis 202x defined by the semi-tubular rivet 252. The hook pivot axis 202x is parallel to the central rod axis 90x and the latch release handle pivot axis 204x.

The upper hook portion 202a also has the projection 274 extending laterally outwardly from each lateral surface. The projection 274 of each side abuts the projection 240 formed on the corresponding inner surface of the latch release handle 204. When the latch release handle 204 pivots forward about its axis 204x, the hook 202 rotates with the handle 204 about 204x once the handle projection 240 on each side of the slot 241 makes contact with the corresponding hook projection 274 on each side of the hook 202. The hook pivot axis 202x therefore moves as the latch release handle 204 pivots about its axis 204x.

The method of operating the latch mechanism 200 will now be described with reference to FIGS. 9A to 10D.

With reference to FIGS. 4, 5 and 10A, the latch mechanism 200 is in a latched configuration when the latch release handle 204 is in a rearwardmost latch release position. As can be seen in FIG. 4, in the rearwardmost latch release handle position, the release handle 204 is disposed inside the slot 126 of the backrest 104. The rear surface 204*b* abuts against the inner surface of the slot 126 and the front surface 204*a* below the groove 246 is disposed longitudinally aligned with the front surface of the removable cover 125 on either side thereof. The front portion of the top flange 244 extends out of the slot 126 and its upper ribbed surface abuts against a lower surface of the backrest cushion 114. The backrest cushion 114 extends forward of the flange 244. The latch release handle 204 is thus disposed so as to not project into the passenger seating space 110 and cause any discomfort to a passenger seated on the seat 100. In this position, as can be seen in FIG. 5, the protrusion 222 of each plate 212 is engaged by the hole 226 of the flange 248. The latch release handle 204 is thus locked with respect to the latch mounting member 210 and will not move forward out of the backrest slot 126 in the absence of a force being applied to disengage the protrusion 222 from the hole 226. In this position, the handle 204 is thus locked and latched.

With reference to FIG. 10A, when the latch release handle 204 is in this rearwardmost position, the hook 202 is in a position such that the upper hook portion 202*a* and the hook pivot axis 202*x* are disposed on a rear side of a plane 300 containing the latch release handle pivot axis 204*x* and the central rod axis 90*x*. In the locked and latched position of the handle 204, the hook 202 is prevented from pivoting rearwards about the hook pivot axis 204*x* by the inner surface of the handle slot 241 which would come into contact with the front edge of the upper hook portion 202*a*. The front edge of the lower hook portion 202*f* is longitudinally aligned with the rear edge of the latch mounting member 210. The rod 90 is disposed in the lower corner B of the groove 268 preventing the hook portion 202*e* from moving forward. In this position of the hook 202, the spring 206 is in a stretched configuration and biases the hook 202 toward the latch mounting member 210, thereby retaining the rod 90 in the groove 268.

With reference to FIGS. 8A to 8B, the latch release handle 204 can be moved from the latched configuration of FIG. 10A by gripping the handle flange 244 and pulling it in a forward direction. When the handle 204 is pivoted forward to a position shown in the FIGS. 10B to 10D, the latch release handle 204 is disposed in the seating space 110 extending above the base 102 as can be seen in FIGS. 8A and 8B. When the latch release handle 204 is pulled forward, the flange 248 moves such that the protrusion 222 disengages from the hole 226 thereby unlocking the handle 204 from the latch mounting member 210. When the protrusion 222 is not received in the hole 226, the handle 204 can be unlatched and the latch mechanism 200 can be placed in an unlatched configuration.

Figure 10B:
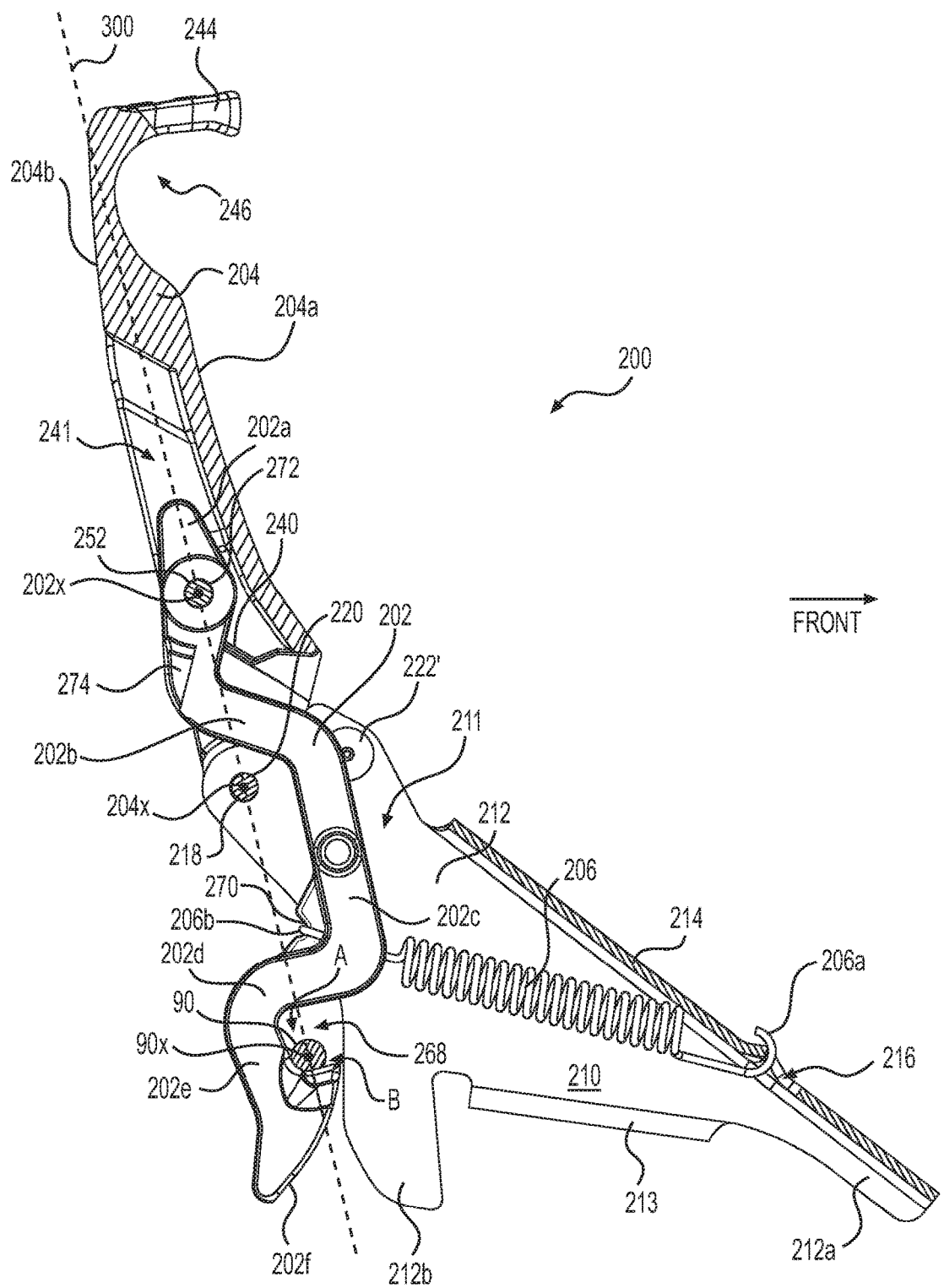
FIG. 10B is a cross-sectional view of the latch mechanism of FIG. 9A, taken along the line 4-4 of FIG. 3D, with the latch mechanism disposed in a neutral and engaged position.

With reference to FIG. 10B, as the latch release handle 204 pivots in a forward direction from its latched position in FIG. 10A, the upper hook portion 202*a* (and the hook pivot axis 202*x*) move forward with the handle 204 while the lower hook portions 202*e*, 202*f* are prevented from moving forward by the rod 90 disposed in the corner B of the groove 268. The hook 202 thus pivots with respect to the handle 204 such that its rear edge moves away from the semi-tubular rivet 220. As the latch release handle 204 pivots forwardly, the hook 202 passes through a position where the hook pivot axis 202*x* is contained in the plane 300. In this position, the handle 204 is pulling the hook 202 upward against the rod 90 disposed the corner B of the groove 268 and the hook 202 exerts a force on the handle 204 downwards towards the rod 90. This position of the handle 204 is thus an unstable, neutral equilibrium position. If the handle 204 is disposed in a position forward of that shown in FIG. 10B such that the hook pivot axis 202*x* is disposed in a front side of the plane 300 (FIG. 10C), the handle 204 would tend to pivot further forward in the absence of an external force being applied to the handle 204. If the handle 204 were disposed in a position rearward of that shown in FIG. 10B such that the hook pivot axis 202*x* is disposed in a rear side of the plane 300 (FIG. 10A), the handle 204 would tend to pivot further rearward in the absence of an external force being applied to the handle 204.

Figure 10C:
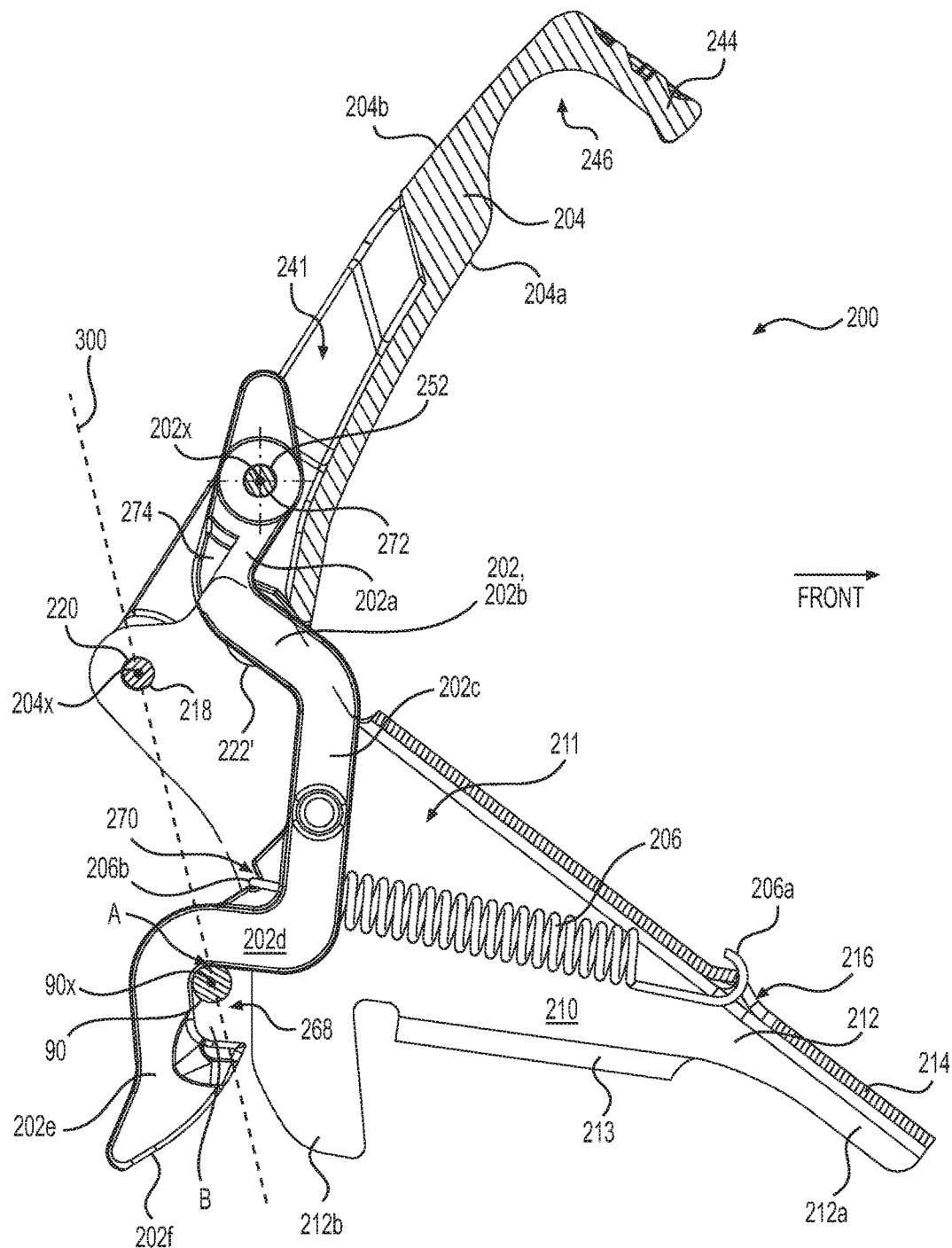
FIG. 10C is a cross-sectional view of the latch mechanism of FIG. 9A, taken along the line 4-4 of FIG. 3D, with the latch mechanism disposed in an unlatched and engaged position.

With reference to FIG. 10C, when the latch release handle 204 pivots further forward from its position in FIG. 10B, the hook 202 pivots with respect to the handle 204 and the rod 90 such that the front edge of the lower hook portion 202*f* moves rearward away from the rear edge of the latch mounting member 210 and the rod 90 is received in the upper corner A of the groove 268. In this position, the rod 90 is still engaged by the hook 202 and the handle 204 is unlatched. The handle 204 tends to fall further forward by its own weight with the friction between the lower hook portion 202*f* and the rod 90 preventing the handle 204 from falling forward. As the latch release handle 204 pivots further forwardly, its projection 240 makes contact with the hook projection 274. When the handle projection 240 abuts the hook projection 274, the handle 204 forces the hook 202 to move with the handle 204, such that the handle 204 and hook 202 pivot together about the handle pivot axis 204*x* as a single integral member.

Figure 10D:
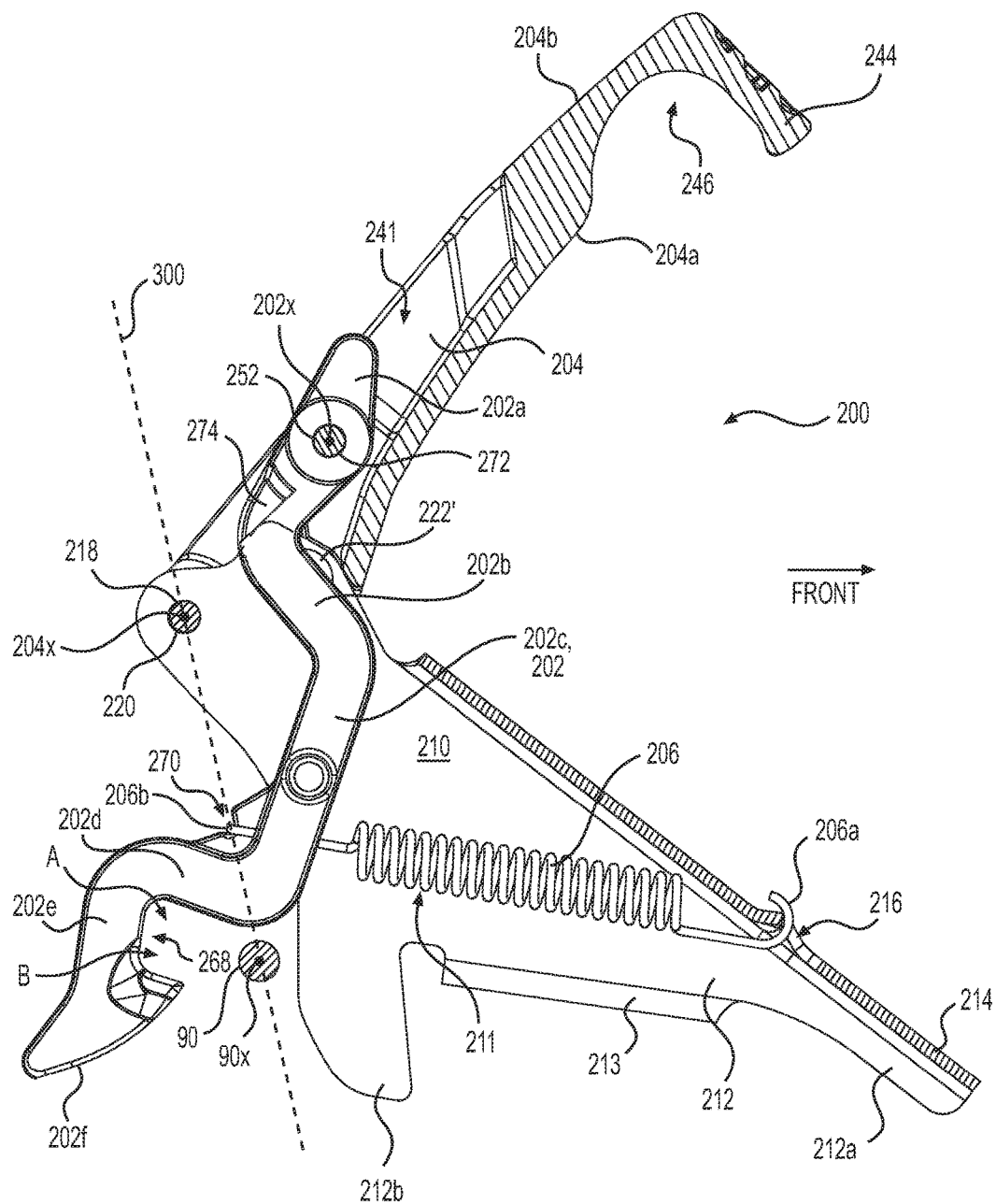
FIG. 10D is a cross-sectional view of the latch mechanism of FIG. 9A, taken along the line 4-4 of FIG. 3D, with the latch mechanism disposed in an unlatched and disengaged position.

With reference to FIG. 10D, when the latch release handle 204 and the hook 202 begin to pivot together about the handle axis 204*x*, the hook portion 202*e* moves rearward away from the rod 90 against the bias of the spring 206 when the handle 204 continues to move forward until the rod 90 is no longer disposed in the groove 268 of the hook 202. The rod 90 is thus disengaged from the hook 202 and no longer retained between the hook 202 and the latch mounting member 210. When the hook 202 is in this disengaged position, the seat 100 can be pulled upwards and away from the frame spacer 82, and disconnected from the vehicle 10. The hook 202 can be disengaged from the rod 90 only if the latch release handle 204 is disposed in an unlatched position and when the external force applied on the handle 204 overcomes the bias force of the spring 206.

As can be seen in FIGS. 8A to 8B, when the latch release handle 204 pivots forward from its latched position (10A) to its unlatched position (FIGS. 10C and 10D), the latch release handle 204 moves so that it is disposed in the seating space 110 extending above the base 102. The latch release handle 204 can thus be unlatched, and the seat 100 can be removed from the vehicle 10, only if there is no passenger seated on the seat 100.

For installation of the seat 100 on the vehicle 10, the front edge 130 of the seat 100 is positioned in the slot 82*d* of the spacer 82 and the latch release handle is disposed in an unlocked and unlatched position. The rear portion of the seat 100 is then pushed downward so as to position the rear edge of the base 102 in front of the brackets 92. As the rear portion of the seat 100 is pushed downwards, the rod 90 pushes upwards between the lower hook portion 202*f* and the latch mounting member 210. As the rod 90 pushes upwards, the curved front edge of the lower portion 202*f* is pushed rearward and away from the latch mounting member 210 so that the rod 90 can enter into the groove 268, and once the rod 90 enters the groove 268, the lower hook portion 212f is pulled back towards the latch mounting member 210 by the biased spring 206. The rod 90 is thereby engaged and retained in the groove 268. The latch release handle 204 can be locked by pushing it into the slot 126 to fasten the seat 100 to the vehicle 10. When the seat 100 is installed with the latch mechanism 200 in the position shown in FIG. 10A, the hook 202 pushes against the rod 90, thereby applying a downward force on the seat 100. This downward force compresses the spacers 103 between the seat base 102 and the space 82, thereby helping to reduce play between the seat 100 and the spacer 82 and to reduce the transmission of vibrations to the seat 100.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A straddle seat for a vehicle comprising:
   a base comprising a first edge and extending generally in a first direction from the first edge;
   a backrest being formed integrally with the base and being spaced from the first edge thereof, the backrest extending away from the base in a second direction, the second direction being generally perpendicular to the first direction, the backrest comprising:
      a first surface facing generally towards the first edge of the base, the first surface defining a slot;
      a second surface facing away from the first edge of the base; and
      a plurality of ribs formed on at least one of the first and second surfaces, the plurality of ribs extending at least in the second direction, the plurality of ribs being configured to allow flexing of at least a portion of the backrest with respect to the base towards the first edge and away from the first edge, the first surface being rigidly connected to the second surface so that the first and second surfaces flex together with respect to the base;
   a latch for removably fastening the seat to the vehicle, the latch comprising a latch release handle disposed at least in part in the slot defined by the first surface of the backrest, the latch release handle being operable to selectively fasten the seat to the vehicle; and
   a left handle and a right handle, each of the left and right handles being connected to at least one of the base and the backrest and being disposed at least in part longitudinally forward of the backrest when the seat is connected on the vehicle.

2. The seat of claim 1, wherein the plurality of ribs is a plurality of first ribs and the backrest further comprises a plurality of second ribs extending transversely with respect to the plurality of first ribs.

3. The seat of claim 1, wherein the base and the backrest are made of plastic.

4. The seat of claim 1, further comprising:
   a left handle mounting portion receiving the left handle extending along a left side of the base when the seat is connected on the vehicle; and
   a right handle mounting portion receiving the right handle extending along a right side of the base when the seat is connected on the vehicle,
   wherein each of the left and right handle mounting portions is integrally connected to the at least one of the base and the backrest.

5. The seat of claim 1, wherein, when the seat is connected on the vehicle:
   the left handle extends along a left side of the base; and
   the right handle extends along a right side of the base.

6. The seat of claim 5, wherein:
   the left handle extends at least one of leftwardly and upwardly away from the base when the seat is connected on the vehicle; and
   the right handle extends at least one of rightwardly and upwardly away from the base when the seat is connected on the vehicle.

7. The seat of claim 5, wherein the backrest extends vertically higher than each of the left and right handles when the seat is connected on the vehicle.

8. The seat of claim 5, wherein each of the left and right handles is removably fastened to the at least one of the base and the backrest.

9. The seat of claim 1, further comprising:
   a left handle mounting portion connecting the left handle to the at least one of the base and the backrest, the left handle mounting portion being integrally formed with the at least one of the base and the backrest, the left handle mounting portion including a left passage housing at least a portion of a left heating wire; and
   a right handle mounting portion connecting the right handle to the at least one of the base and the backrest, the right handle mounting portion being integrally formed with the at least one of the base and the backrest, the right handle mounting portion including a right passage housing at least a portion of a right handle heating wire.

10. The seat of claim 1, further comprising a seat base cushion disposed at least in part on the base and removably fastened thereto.

11. The seat of claim 10, wherein the seat base cushion extends forward of the first edge of the base when the seat is connected on the vehicle.

12. The seat of claim 1, wherein:
   the first edge is the front edge;
   the first direction is a longitudinal direction;
   the second direction is a vertical direction;
   the backrest further comprises a top edge extending in a lateral direction between a left end and a right end;
   the backrest flexes laterally progressively from an unflexed position to a flexed position such that one of the left end and right end of the top edge is displaced by a greater amount than the other of the left end and right end of the top edge between their respective unflexed and flexed positions.

13. The seat of claim 12, wherein:
   the backrest further flexes vertically progressively such that an upper portion thereof is displaced by a greater angle than a lower portion thereof between their respective unflexed and flexed positions.

14. A straddle seat for a vehicle comprising:
   a base comprising a first edge and extending generally in a first direction from the first edge;
   a backrest being formed integrally with the base and being spaced from the first edge thereof, the backrest extending away from the base in a second direction, the second direction being generally perpendicular to the first direction, the backrest comprising:
      a first surface facing generally towards the first edge of the base, the first surface defining a slot;
      a second surface facing away from the first edge of the base; and a plurality of ribs formed on at least one of the first and second surfaces, the plurality of ribs extending at least in the second direction, the plurality of ribs being configured to allow flexing of at least a portion of the backrest with respect to the base towards the first edge and away from the first edge, the first surface being rigidly connected to the second surface so that the first and second surfaces flex together with respect to the base;

a backrest cushion disposed on the first surface of the backrest and removably fastened thereto, the backrest cushion being configured to abut a back of a rider seated above the base when the seat is connected on the vehicle; and a latch for removably fastening the seat to the vehicle, the latch comprising a latch release handle disposed at least in part in the slot defined by the first surface of the backrest, the latch release handle being operable to selectively fasten the seat to the vehicle.

15. A straddle seat for a vehicle comprising:

a base comprising a first edge and extending generally in a first direction from the first edge;

a backrest being formed integrally with the base and being spaced from the first edge thereof, the backrest extending away from the base in a second direction, the second direction being generally perpendicular to the first direction, the backrest comprising:
  a first surface facing generally towards the first edge of the base, the first surface defining a slot;
  a second surface facing away from the first edge of the base; and
  a plurality of ribs formed on at least one of the first and second surfaces, the plurality of ribs extending at least in the second direction, the plurality of ribs being configured to allow flexing of at least a portion of the backrest with respect to the base towards the first edge and away from the first edge, the first surface being rigidly connected to the second surface so that the first and second surfaces flex together with respect to the base; and a latch for removably fastening the seat to the vehicle, the latch comprising:
  a latch release handle disposed at least in part in the slot defined by the first surface of the backrest, the latch release handle being operable to selectively fasten the seat to the vehicle; and
  a hook connected to at least one of the base and the backrest, the hook being movable between at least a first hook position and a second hook position, the hook being configured to engage a portion of the vehicle when in the first hook position with the seat disposed on the vehicle, the hook being configured to disengage from the portion of the vehicle when in the second hook position with the seat disposed on the vehicle,
  the latch release handle being connected to the hook for moving the hook between the first hook position and the second hook position, at least one portion of the latch release handle being disposed in the slot when the hook is in the first hook position, the at least one portion of the latch release handle being disposed at least in part outside the slot and protruding out of the backrest when the hook is in the second hook position.

16. The seat of claim 15, wherein the base and the backrest define a seating space to accommodate a rider, the seating space extending longitudinally forward of the first surface and vertically above the base when the seat is connected on the vehicle;
  wherein:
    the latch release handle is disposed outside the seating space when the hook is disposed in the first hook position; and
    the latch release handle is disposed at least in part in the seating space when the hook is in the second hook position.

17. The seat of claim 15, wherein:
the hook is connected to the latch release handle; and
the latch release handle is pivotally connected to at least one of the base and the backrest, the latch release handle being pivotable between at least a first and a second latch release handle positions:
  in the first latch release handle position, the hook is in the first hook position and engaged with the portion of the vehicle and the at least one portion of the latch release handle is disposed in the slot; and
  in second latch release handle position, the hook is in the second hook position and disengaged from the portion of the vehicle, and the at least one portion of the latch release handle is disposed outside the slot.

18. The seat of claim 17, wherein:
the portion of the vehicle is a rod having a central rod axis;
the latch release handle is pivotable with respect to the at least one of the base and backrest about a latch release handle pivot axis disposed parallel to the central rod axis; and
the hook is pivotable with respect to the latch release handle about a hook pivot axis disposed parallel to the central rod axis, wherein:
  in the first hook position, the hook pivot axis is disposed on a first side of a plane containing the central rod axis and the latch release handle pivot axis; and
  in the second hook position, the hook pivot axis is disposed on a second side of the plane containing the central rod axis and the latch release handle pivot axis, the second side being opposite the first side.

19. The seat of claim 18, wherein the latch further comprises a spring connected to the hook and at a position spaced from the hook pivot axis;
  wherein:
    in the first hook position, the spring resiliently biases the hook to engage the rod.

20. The seat of claim 15, wherein the latch further comprises a spring connected to the hook and resiliently biasing the hook towards the first hook position.

21. A straddle seat for a vehicle comprising:
a base comprising a front edge and extending generally in a longitudinal direction from the front edge;
a backrest being formed integrally with the base and being spaced from the front edge thereof, the backrest extending away from the base in a vertical direction, the backrest comprising:
  a first surface facing generally towards the front edge of the base, the first surface defining a slot;
  a second surface facing away from the front edge of the base; and
  a plurality of ribs formed on at least one of the first and second surfaces, the plurality of ribs extending at least in the vertical direction, the plurality of ribs being configured to allow flexing of at least a portion of the backrest with respect to the base towards the front edge and away from the front edge, the first surface being rigidly connected to the second surface so that the first and second surfaces flex together with respect to the base, the backrest being operable to flex vertically progressively from an unflexed position to a flexed position such that an upper portion thereof is displaced by a greater angle than a lower portion thereof between their respective unflexed and flexed positions; and a latch for removably fastening the seat to the vehicle, the latch comprising a latch release handle disposed at least in part in the slot defined by the first surface of the backrest, the latch release handle being operable to selectively fasten the seat to the vehicle.

22. A seat for selective connection to a vehicle, the seat comprising:
   a base;
   a seat base cushion disposed at least in part on the base;
   a backrest connected to the base and extending generally perpendicular to the base;
   a backrest cushion connected to the backrest and configured to abut a back of a rider seated on the seat base cushion when the seat is connected to the vehicle, the backrest cushion and the seat base cushion defining a seating space disposed above the seat base cushion and longitudinally forward of the backrest cushion when the seat is connected to the vehicle; and
   a latch mechanism for selectively fastening the seat to the vehicle, the latch mechanism having a latched configuration and an unlatched configuration, the latch mechanism having a latch release handle for moving the latch mechanism between the latched configuration and the unlatched configuration, the latch release handle being accessible via a space between the seat base cushion and the backrest cushion, at least one portion of the latch release handle being disposed in the seating space when the latch mechanism is in the unlatched configuration.

23. The seat of claim 22, wherein:
   the latch release handle is movable between a first latch release handle position and a second latch release handle position, wherein:
      in the first latch release handle position, the at least one portion of the latch release handle is disposed outside the seating space and the latch mechanism is in the latched configuration, and
      in the second latch release handle position, the at least one portion of the latch release handle is disposed in the seating space and the latch mechanism is in the unlatched configuration.

* * * * *